(12) United States Patent
Shen et al.

(10) Patent No.: US 8,755,569 B2
(45) Date of Patent: Jun. 17, 2014

(54) METHODS FOR RECOGNIZING POSE AND ACTION OF ARTICULATED OBJECTS WITH COLLECTION OF PLANES IN MOTION

(75) Inventors: Yuping Shen, Orlando, FL (US); Hassan Foroosh, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 947 days.

(21) Appl. No.: 12/790,083

(22) Filed: May 28, 2010

(65) Prior Publication Data

US 2010/0303303 A1    Dec. 2, 2010

Related U.S. Application Data

(60) Provisional application No. 61/182,126, filed on May 29, 2009.

(51) Int. Cl.
   *G06K 9/00* (2006.01)
(52) U.S. Cl.
   USPC .................................................. 382/107
(58) Field of Classification Search
   None
   See application file for complete search history.

(56) References Cited

U.S. PATENT DOCUMENTS

| | | | |
|---|---|---|---|
| 6,335,977 B1 * | 1/2002 | Kage ............................. | 382/107 |
| 6,741,756 B1 * | 5/2004 | Toyama et al. ............... | 382/291 |
| 6,816,632 B1 | 11/2004 | Slice | |
| 6,941,239 B2 | 9/2005 | Unuma et al. | |
| 6,944,319 B1 | 9/2005 | Huang et al. | |
| 7,158,656 B2 | 1/2007 | Covell et al. | |
| 7,317,836 B2 | 1/2008 | Fujimura et al. | |
| 8,005,257 B2 * | 8/2011 | Venetsky et al. .............. | 382/100 |
| 8,320,621 B2 * | 11/2012 | McEldowney ................ | 382/103 |
| 8,537,112 B2 * | 9/2013 | Underkoffler et al. ........ | 345/158 |
| 2003/0169906 A1 | 9/2003 | Gokturk et al. | |
| 2003/0218672 A1 * | 11/2003 | Zhang et al. ................ | 348/14.16 |
| 2003/0235334 A1 | 12/2003 | Okubo | |
| 2004/0120581 A1 | 6/2004 | Ozer et al. | |
| 2004/0240706 A1 | 12/2004 | Wallace et al. | |
| 2005/0265583 A1 * | 12/2005 | Covell et al. .................. | 382/103 |
| 2008/0152191 A1 * | 6/2008 | Fujimura et al. .............. | 382/103 |
| 2010/0191541 A1 * | 7/2010 | Prokoski ........................... | 705/2 |
| 2013/0155058 A1 * | 6/2013 | Golparvar-Fard et al. .... | 345/419 |

* cited by examiner

*Primary Examiner* — Nancy Bitar
(74) *Attorney, Agent, or Firm* — Timothy H. Van Dyke; Beusse, Wolter, Sanks, Mora & Maire, P.A.

(57) ABSTRACT

The invention comprises an improved system, method, and computer-readable instructions for recognizing pose and action of articulated objects with collection of planes in motion. The method starts with a video sequence and a database of reference sequences corresponding to different known actions. The method identifies the sequence from the reference sequences such that the subject in performs the closest action to that observed. The method compares actions by comparing pose transitions. The cross-homography invariant may be used for view-invariant recognition of human body pose transition and actions.

13 Claims, 20 Drawing Sheets

(a)

(b)

(a) An alignment of two golf swing sequences.

(b) An alignment of two tennis-serve sequences.

(c) $\tau = 0.3$ (d) $\tau = 0.4$ (a) Example 1: matching two golf-swing sequences.

(b) Example 2: matching two tennis-serve sequences.

(c)

(d)

METHODS FOR RECOGNIZING POSE AND ACTION OF ARTICULATED OBJECTS WITH COLLECTION OF PLANES IN MOTION

CROSS-REFERENCE TO RELATED APPLICATIONS

This application claims priority from U.S. provisional application Ser. No. 61/182,126, filed May 29, 2009, the disclosure of which is incorporated herein by reference in its entirety.

STATEMENT REGARDING FEDERALLY SPONSORED RESEARCH

Development of this invention was supported in part by Grant No. 16406039 from National Science Foundation. The government has certain rights in this invention.

BACKGROUND OF THE INVENTION

1. Technical Field

This invention relates to pose and action recognition, and specifically to an improved system, method, and computer-readable instructions for recognizing pose and action of articulated objects with collection of planes in motion.

2. Discussion of the Background

Conventional techniques for pose estimation detect various objects of a subject such as body parts of a human. In the study of human motion, set of body points is widely used to represent a human body pose. Additionally, pose estimation can determine an orientation of the body part. Previously proposed projective invariants are dealing with a set of stationary points, and almost exclusively derived from cross-ratio, which is an invariant of a set of points on a rigid object. The only exception in the literature was the study of invariants defined with Cartan mobile frames. The difficulty with the latter is that it deals only with invariants of evolution of a curve, which are non-linear, are not easy to generalize to point sets in 3D space, and cannot be decomposed into motions of planes with well-studied properties.

Specifically, human action recognition has been the subject of extensive studies in the past. The main challenges are due to perspective distortions, differences in viewpoints, unknown camera parameters, anthropometric variations, and the large degrees of freedom of articulated bodies. To make the problem more tractable, researchers have made simplifying assumptions on one or more of the following aspects: (1) camera model, such as scaled orthographic or calibrated camera; (2) camera pose, i.e. little or no viewpoint variations; (3) anatomy, such as isometry, coplanarity of a subset of body points, etc.

There are mainly two lines of research to tackle view invariance: One is based on the assumption that the actions are viewed by multiple cameras, and the second is based on assuming that the actions are captured in monocular sequences by stationary cameras. The obvious limitation of multi-camera approach is that most practical applications are limited to a single camera. In the second category several ideas have been explored, e.g. the invariants associated with a given camera model, such as affine, or projective, rank constraints on the action space represented by a set of basis functions, or the use of epipolar geometry induced by the same pose in two views.

A number of patents exist which relate to pose and action recognition, including, U.S. Pat. Nos. 7,317,836, 7,158,656, 6,944,319, 6,941,239, 6,816,632, 6,741,756, 20030169906, 20030235334, 20040120581, 20040240706, 20050265583; all of which are incorporated herein by reference.

Accordingly, there is a need in the art for a computer-implemented system and method for recognizing pose and action of articulated objects with collection of planes in motion. The present invention is designed to address these needs.

SUMMARY OF THE INVENTION

Broadly speaking, the present invention is an improved system, method, and computer-readable instructions for recognizing pose and action of articulated objects with collection of planes in motion. The invention may be used with any user interfaces based on gestures, including Human Computer Interfaces (HCI) with gestures (hand, arm, face, body). It provides for view invariant recognition of pose, action, and gestures (hand, body, face). It may also be used in conjunction with video surveillance.

The approach herein is based on geometry. It assumes a fully projective camera with no restrictions on pose and viewing angles. Moreover, it relaxes restrictive anthropometric assumptions such as isometry. This is due to the fact that unlike existing methods that regard an action as a whole, or as a sequence of individual poses, it represents an action as a set of non-rigid pose transitions defined by triplets of points—that is it decomposes each pose into a set of point-triplets and find invariants for the rigid motion of the planes defined by triplets across two frames. Therefore, the matching score in this method is based on pose transition, instead of being based directly on individual poses or on the entire action. This approach can also accommodate the possibility of self-occlusion, which may occur under some poses.

In an embodiment, a moving plane observed by a fixed camera induces a fundamental matrix F across multiple frames, where the ratios among the elements in the upper left 2×2 submatrix are herein referred to as the Fundamental Ratios. The fundamental ratios are invariant to camera parameters, and hence can be used to identify similar plane motions from varying viewpoints. Furthermore, using the fact that the homography induced by the motion of a plane defined by a triplet of body points in two identical body pose transitions reduces to the special case of a homology, it exploits the equality of two of its eigenvalues to impose constraints on the similarity of the pose transitions between two subjects, observed by different perspective cameras and from different viewpoints. Thus, for action recognition, it decomposes a body posture into a set of point triplets (planes). The similarity between two actions is then determined by the motion of point triplets and hence by their associated fundamental ratios and the equality of the eigenvalues of the cross-homography, providing thus view-invariant recognition of actions. As a result, the method herein can recognize actions under substantial amount of noise, even when they have dynamic timeline maps, and the viewpoints and camera parameters are unknown and totally different.

In embodiments, this technique introduces projective invariants of a moving plane defined by a triplet of points. Two specific invariants are introduced: the cross-homography invariant and the vector of fundamental ratios. Both invariants being projective are preserved across different perspective views by different cameras. By decomposing the motion of a set of N>3 freely moving points into the motion of point triplets, a highly non-linear problem of characterizing the free motion of N points is reduced into a set of linear problems of characterizing the rigid motion of planes defined by every triplet. The proposed invariants provide an elegant solution to recognize same poses and actions performed by articulated bodies viewed by different cameras at different viewing angles. Important applications include gesture-based computer interfaces and video surveillance.

In an embodiment of the present invention, the motion of a set of points moving freely in space or moving as part of an articulated body can be decomposed into a collection of rigid motions of planes defined by every triplet of points in the set. The significance of this observation is that articulated or freely moving points are difficult to study, whereas the rigid motion of planes in space is well understood. This provides a means of decomposing a very difficult and highly non-linear problem into a collection of relatively simpler and linear problems.

The invention can be implemented in numerous ways, including as a system, a device/apparatus, a method, or a computer readable medium. Several embodiments of the invention are discussed below.

As a method, the invention comprises a computer-implemented method for recognizing pose and action of articulated objects with collection of planes in motion. In an example embodiment, the method comprises (1) receiving by the computing device action sequence information (in real time or previously recorded) as a set of labeled points for each image, wherein the received information requires only a single camera view, and wherein a human body pose P is generally represented by M body points: $P=\{mi=1 \ldots M\}$ obtained by using articulated object tracking techniques, (2) processing the action sequence information using the methods of the invention (i.e., solve the action recognition problem) to find a probable match by comparing the information to a reference sequence (e.g., a sequence of 2D poses for each known action maintained in an action database of actions), wherein the known actions require only one example view of each action in the database, (3) outputting the match along with optional confidence level information of one or more matches (e.g., outputting the confidence level as a percentage or, if more than one probable match is located, ranking the matches by confidence level).

The methods of the present invention may be implemented as a computer program product with a computer-readable medium having code thereon implementing the steps of the invention.

As an apparatus, the present invention may include an input camera device and a computing device having at least one processor, a memory coupled to the processor, a program residing in the memory which implements the methods of the present invention, in communication with a database of known actions. In one embodiment, the system includes a standard or specialized optical recognition camera to receive information associated with a subject (in real-time or as a stored sequence of motions) wherein only one view is required, a database of known actions wherein only one example of each action is required, and a processing module to implement the steps of the invention, and an output module to output a result of the method.

In a further embodiment, the invention comprises a computer-implemented method for recognizing pose and action of articulated objects, comprising: receiving by a computing device action sequence information as a set of points for each of a plurality of images, wherein the set of points represents a pose P defined by M body points obtained by using an articulated object tracking technique; processing the action sequence information by solving via the computing device an action recognition problem to find one or more probable matches by comparing based on pose transition the action sequence information to a reference sequence, wherein the action recognition problem decomposes motions of the set of points into a collection of rigid motions of planes defined by triplets of points in the set; and outputting at least one of the one or more probable matches.

The action sequence information may be received in real time or from previously recorded action sequence information. The reference sequence may include a sequence of two-dimensional (2D) poses for each of a known action maintained in an action database of known actions. The pose P may be represented by M body points such that $P=\{mi=1 \ldots M\}$. The plurality of images may be obtained from a single camera view. Optionally, the method may include calculating and outputting by the processing device confidence level information for the one or more probable matches.

In a further embodiment, the action recognition problem uses action sequence information comprising a set of non-rigid pose transitions defined by the triplets of points, such that each pose is decomposed into the collection of rigid motions of planes defined by triplets of points in the set, wherein the triplets of points represent planes and invariants of the planes are found for a rigid motion of the planes defined by the triplets across two frames. The invariants of the planes may be found by one or both of a vector of fundamental ratios and an equality of eigenvalues of cross-homography, thereby providing a view-invariant recognition of actions. The vector of fundamental ratios defines three projective invariants for a configuration involving a moving plane as a moving triplet of points as observed in two frames by a stationary camera.

The output probable match(es) may be utilized in one or more of a video surveillance system or a gesture-based computer interface, or the like.

In a further embodiment, the invention comprises a computer readable medium containing program instructions for execution on a computing device, which when executed by the computing device, causes the computing device to: receive action sequence information as a set of points for each of a plurality of images, wherein the set of points represents a pose P defined by M body points obtained by using an articulated object tracking technique; process the action sequence information by solving an action recognition problem to find one or more probable matches by comparing based on pose transition the action sequence information to a reference sequence, wherein the action recognition problem decomposes motions of the set of points into a collection of rigid motions of planes defined by triplets of points in the set; and output at least one of the one or more probable matches.

The computer readable medium may further comprise code devices for calculating and outputting by the processing device confidence level information for the one or more probable matches. The action recognition problem may use action sequence information comprising a set of non-rigid pose transitions defined by the triplets of points, such that each pose is decomposed into the collection of rigid motions of planes defined by triplets of points in the set, wherein the triplets of points represent planes and invariants of the planes are found for a rigid motion of the planes defined by the triplets across two frames. The invariants of the planes may be found by one or both of a vector of fundamental ratios and an equality of eigenvalues of cross-homography, thereby providing a view-invariant recognition of actions. The vector of fundamental ratios defines three projective invariants for a configuration involving a moving plane as a moving triplet of points as observed in two frames by a stationary camera.

In a still further embodiment, the invention comprises a system for recognizing pose and action of articulated objects, comprising: a computing device having at least one processing device, a memory coupled to the processing device, the computing device in communication with a data source comprising action sequence information of an articulated object and a database of known actions; wherein the processing device executes a program residing in the memory to: receive the action sequence information from the data source as a set of points for each of a plurality of images, wherein the set of points represents a pose P defined by M body points obtained by using an articulated object tracking technique; process the action sequence information by solving an action recognition problem to find one or more probable matches by comparing based on pose transition the action sequence information to a reference sequence from the database of known actions, wherein the action recognition problem decomposes motions of the set of points into a collection of rigid motions of planes defined by triplets of points in the set; and output at least one of the one or more probable matches.

The system may further comprise calculating and outputting by the processing device confidence level information for the one or more probable matches. The action recognition problem may use action sequence information comprising a set of non-rigid pose transitions defined by the triplets of points, such that each pose is decomposed into the collection of rigid motions of planes defined by triplets of points in the set, wherein the triplets of points represent planes and invariants of the planes are found for a rigid motion of the planes defined by the triplets across two frames. The invariants of the planes may be found by one or both of a vector of fundamental ratios and an equality of eigenvalues of cross-homography, thereby providing a view-invariant recognition of actions. The vector of fundamental ratios defines three projective invariants for a configuration involving a moving plane as a moving triplet of points as observed in two frames by a stationary camera.

The advantages of the invention are numerous. First, rather than needing hundreds of examples and different views in order to essentially have all viewing directions of a motion (i.e., exhaustive information), the present invention only requires one viewing angle of the subject and one example of each known action in the database (i.e., it is invariant to camera intrinsic parameters and viewpoint). The idea of decomposing the motion of a set of points on a non-rigid object as the motions of a collection of point triplets provides a clever means of decomposing a very difficult and highly non-linear problem into a set of relatively simpler and linear problems. On the other hand, the significance of the two invariants discovered is that, first of all, they describe invariants associated with motion. This is unlike existing projective invariants that deal with invariants of a set of rigid points in space, e.g. cross-ratio, collinearity, concurrency, etc. Second the invariants are preserved with variations in camera internal parameters. Third, they provide means of recognizing similar motions of two sets of moving points observed by two cameras from different viewing angles.

Other aspects and advantages of the invention will become apparent from the following detailed description taken in conjunction with the accompanying drawings, illustrating, by way of example, the principles of the invention.

All patents, patent applications, provisional applications, and publications referred to or cited herein, or from which a claim for benefit of priority has been made, are incorporated herein by reference in their entirety to the extent they are not inconsistent with the explicit teachings of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENT

Figure 1:
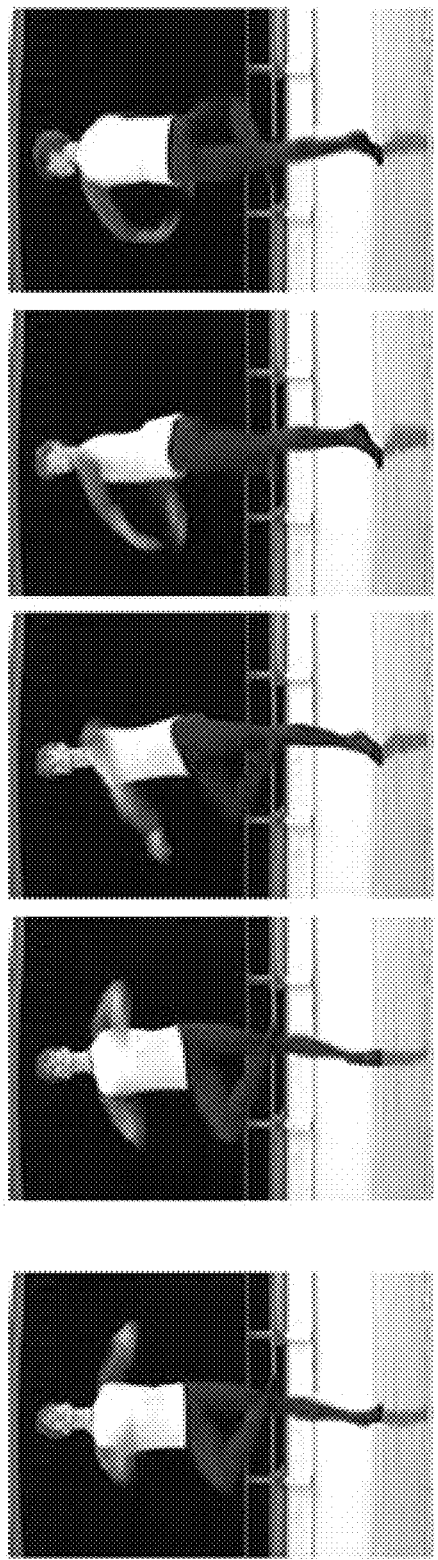
FIG. 1 shows two distinct actions with corresponding poses.

Referring now to the drawings, the preferred embodiment of the present invention will be described. The invention comprises an improved system, method, and computer-readable instructions for recognizing pose and action of articulated objects with collection of planes in motion.

An embodiment of the method starts with a video sequence and a database of reference sequences corresponding to different known actions. The method identifies the sequence from the reference sequences such that the subject in performs the closest action to that observed. The method compares actions by comparing pose transitions. Since action can be regarded as a sequence of poses, a straightforward approach to match two actions is to check the pose-to-pose correspondences. Two same body poses observed by different cameras are related by epipolar geometry via the fundamental matrix, which provides a constraint to match the two poses, regardless of camera calibration matrices or viewpoints.

The 3D body structure of a human can be divided into triplets of body points, each of which determines a plane in the 3D space when the points are not collinear. The problem of comparing articulated motions of human body thus transforms to comparing rigid motions of body planes (triplets). The motion of a plane induces a fundamental matrix, which can be identified by its associated fundamental ratios. If two pose transitions are identical, their corresponding body point triplets have the same fundamental ratios, which provide a measure for matching two pose transitions.

Figure 2:
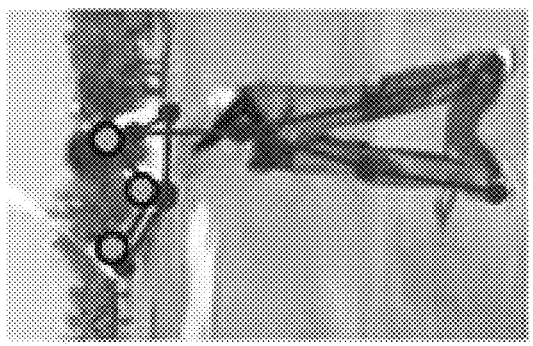
FIG. 2 shows an example of similar pose transitions.
Figure 2:
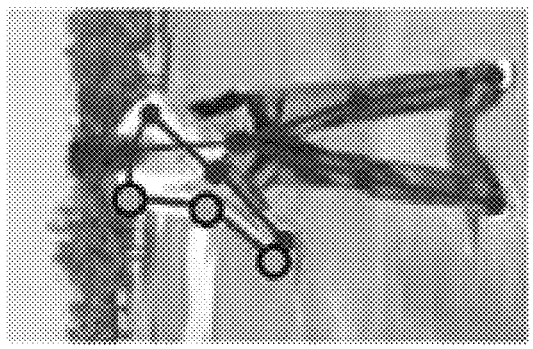
Figure 2:
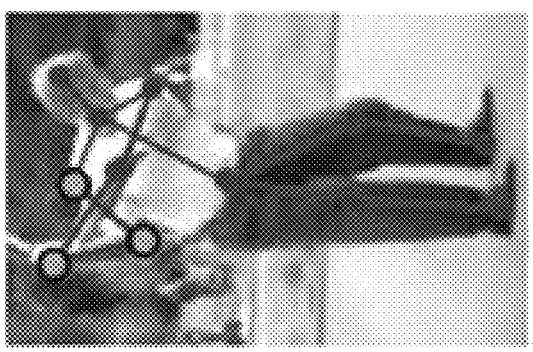
Figure 2:
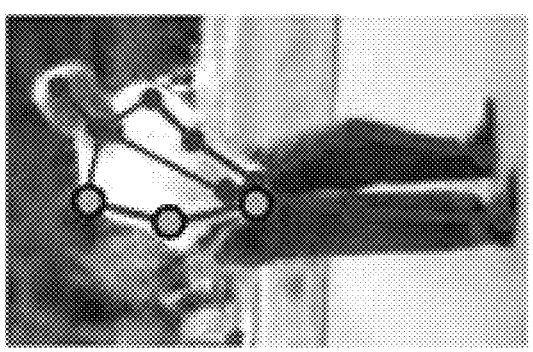

This invention introduces projective invariants of a moving plane defined by a triplet of points. Two specific invariants are introduced: the cross-homography invariant and the vector of fundamental ratios. The cross-homography invariant may be used for view-invariant recognition of human body pose transition and actions. Assume $\pi_1$ and $\pi_2$ are two planes and $C_1$ and $C_2$ two points not on the planes (see FIG. 2). Let $H_1$ and $H_2$ be the two homographies induced by $\pi_1$ and $\pi_2$ under any pair of central projections through $C_1$ and $C_2$. The projections of the line of intersection of; and $\pi_1$ and $\pi_2$ and those of points $C_1$ and $C_2$ are invariant under $H \sim H_1 H_2^{-1}$ independently of the positions of $C_1$ and $C_2$ and the choice of the two central projection planes.

The significance of this invariant is that it also holds if we have two separate configurations: i.e. a pair $\pi_{11}$ and $\pi_{12}$ with a point $C_1$ not on the planes, and a pair it $\pi_{21}$ and $\pi_{22}$ with a point $C_2$ not on the planes. Then the cross-homography invariance still holds as long as the configurations of the two pairs of planes in the 3D space differ only by a similarity transformation.

This observation is critical for our target applications, since if we consider the pair $\pi_{11} \to \pi_{12}$ as a discrete motion of a plane in the 3D space, and the pair $\pi_{21} \to \pi_{22}$ as the discrete motion of a second plane, and if the two motions are identical (or more generally differ only by a similarity transformation), then this can be identified regardless of the choice of the central projections and positions of $C_1$ and $C_2$. In other words, similar motions of two planes observed by two arbitrary and uncalibrated unknown cameras can be identified using the cross-homography invariant regardless of the pose and the intrinsic parameters of the two cameras.

The cross-homography invariant may be used for view-invariant recognition of human body pose transition and actions. For this purpose, note that any articulated object can be modeled by a set of N points corresponding to its joints and end points. On the other hand, any triplet of points out of these N points define the image of a plane in the 3D space, which after a pose transition would yield the image of the displaced plane. The cross-homography invariant exhibits itself as a constraint on the eigenvalues of the matrix H, stating that when the motions of two planes observed by two cameras are identical, two of the eigenvalues of H must be equal. This is proven to be remarkable robust and resilient to noise for recognizing similar action of articulated objects from different viewing angles by completely different cameras.

Vector of fundamental ratios: For a pair of natural cameras, i.e. cameras with zero skew and unit aspect ratio, we can show that the upper-left 2×2 submatrix of the fundamental matrix $F^{2 \times 2}$ is invariant to camera intrinsic parameters. Moreover, the ratios among the components of $F^{2 \times 2}$ remain invariant for two cameras undergoing same motion up to a similarity transformation. This implies that these ratios do not depend on the absolute position and orientation of the camera but rather on its relative motion. A more interesting interpretation of these invariant ratios, which we refer to as fundamental ratios, is depicted in herein. A fundamental matrix induced by a moving camera observing a stationary planar surface is dual to a fundamental matrix induced by a moving plane observed by a stationary camera.

An interesting application of fundamental ratios in gesture and action recognition based on the above dual interpretation is provided. Essentially, fundamental ratios define 3 projective invariants for a configuration involving a moving plane (moving triplet of points) observed in two frames by a stationary camera.

A detailed description of embodiments of the invention follow herein, with reference first to action recognition based in homographies induced by point triplets:

We turn first to Representation of Pose. Set of body points is a widely used representation of human pose in action recognition, partly due to the fact that human body can be modeled as an articulate object, and partly because body points can capture sufficient information to achieve the task of action recognition. Using this representation, an action is regarded as a sequence of point sets, or a set of point trajectories in time. Other representations of pose include subject silhouette, optical flow and local space time features. We use the body point representation. Thus, an action is represented as a sequence of point sets. These points, which are the only inputs to our algorithm, can be obtained by using articulated object tracking techniques. We shall, henceforth, assume that tracking has already been performed on the data, and that we are given a set of labeled points for each image.

Now we look at Pose Transitions. Since action can be regarded as a sequence of poses, a straightforward approach to match two actions is to check the pose-to-pose correspondences. Two same body poses observed by different cameras are related by epipolar geometry via the fundamental matrix, which provides a constraint to match the two poses, regardless of camera calibration matrices or viewpoints. Pose-to-pose correspondence, however, is a necessary, but not a sufficient condition for action correspondence.

Consider the following case: A subject holds a pose as illustrated in FIG. 1 (a) during the sequence 1, while in sequence 2 (FIG. 1 (b)) it performs a spin, i.e. a rotation around some axis while keeping the same pose as the subject in FIG. 1 (a). These two actions are obviously distinct; however there exist many pose-to-pose correspondences between them since the pose remains unchanged during the two actions. Therefore, additional constraints other than pose correspondence are required to tackle this problem. In addition, most fundamental matrix based methods enforce the constraint that all pose-to-pose correspondences share the same epipolar geometry, i.e., the same fundamental matrix, which is critical to the success of these methods.

Another limitation of fundamental matrix based methods is that they require at least 7 or 8 point correspondences for each pair of poses to measure their similarity. However, in practice, in order to overcome errors, they require far more points, which may not be always possible, especially when self-occlusions exist. For pose-to-pose based methods, this requirement is repeated for every pair of poses (i.e. every image pair), increasing thus their noise sensitivity. We overcome this problem by decomposing body pose into point triplets leading to a largely over-determined problem as described below.

Since actions are spatio-temporal data in 4D, the temporal information is essential to the perception and understanding of actions. However, this is ignored when working directly on individual poses, as in the methods based on fundamental matrix. We alleviate this problem by measuring the similarity between pose transitions, rather than poses themselves. Pose transition includes the temporal information of human motion, while keeping the task at the atomic level. Thus, an action can be regarded as a sequence of pose transitions. In the example shown in FIG. 1, although sequences (a) and (b) have the same poses, they are performing different sequences of pose transitions, making it possible to distinguish between the two actions.

Statement 1: Two actions are identical if and only if they start at the same pose, and follow the same sequences of pose transitions.

This statement implies that the recognition and matching of two actions can be achieved by measuring the similarity between their sequences of pose transitions. The problem is then reduced to matching pose transitions, which is stated as follows: given two pairs of poses, denoted by $(I_1, I_2)$ and $(Ji, Jj)$ (see FIG. 2), we aim to determine whether the transformation from $I_1$ to $I_2$ matches to that from Ji to Jj. Note that $I_{1,2}$ and $J_{i,j}$ are sets of 2D labeled points that are observed by cameras with different intrinsic parameters and from different viewpoints.

We turn now to Matching Pose Transitions.

First, we look at Homographies Induced by a Triplet of Body Points: Using point representation, a pose is characterized by a set of body points. Each triplet of non-collinear points specifies a scene plane. Therefore, a non-rigid pose transition can be decomposed into the rigid motions of scene planes determined by all non-collinear triplets. This has the following advantages: (1) The similarity of pose transitions for articulated bodies can be measured by matching the rigid motions of scene planes defined by all triplets of body points—rigid motions of planes is a much better understood and more widely studied subject. (2) The representation leads to a highly over-determined formulation of the problem, allowing thus to achieve robustness to noise and self-occlusions: Given n point correspondences, we obtain $$\binom{n}{3}$$

criteria to measure the similarity. Even if there exist occluded body points, they can be ignored since by far the vast majority of point triplets would be typically available to fulfill the task. (3) Anthropometric restrictions can be relaxed, since only the transitions of planes in the 3D space matter, and not the points defining these planes or the ratios of the distances between these points.

Consider the case that $(I_1,I_2)$ corresponds to $(J_i,J_j)$, and the transformation from $I_1$ to $I_2$ corresponds to that from $J_i$ to $J_j$. $I_{1,2}$ and $J_{i,j}$ can then be regarded as the images of same moving subject viewed by two different cameras. Suppose that $I_{1,2}$ are observed by camera P1 and $J_{i,j}$ by camera $P_2$. $P_1$ and $P_2$ may have different intrinsic and extrinsic parameters. As described earlier, these point correspondences induce an epipolar geometry via the fundamental matrix F. The projection of the camera center of $P_2$ in $I_1$ and $I_2$ is given by the epipole e1, which is found as the right null vector of F. Similarly the image of the camera center of $P_1$ in $J_i$ and $J_j$ is the epipole $e_2$ given by the right null vector of $F^T$.

Figure 3:
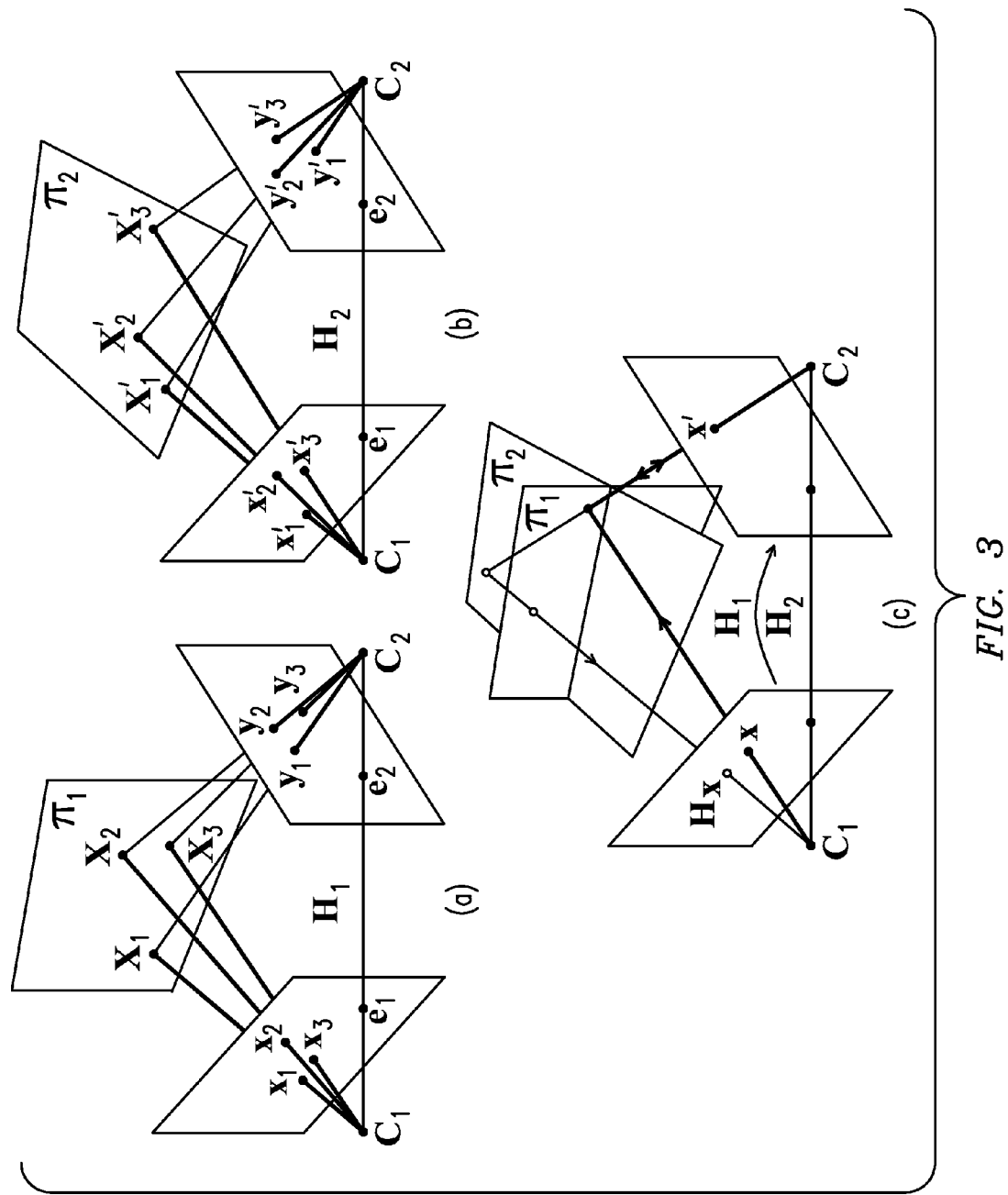
FIG. 3 shows homographies induced by a moving triplet of points.

Let us now consider an arbitrary triplet of 3D body points (see highlighted points in FIG. 2 for example), $\Delta=\{X_{1,2,3}\}$, which corresponds to $\Delta_1=(x_{1,2,3})$ in $I_1$ and $\Delta_i=(y_{1,2,3})$ in $J_i$. After the pose transformation, $\Delta$ transforms to $\Delta'=\{X'_{1,2,3}\}$, which corresponds to $\Delta_2=(X_{1,2,3})$, in $I_2$ and $\Delta_j=(y_{1,2,3})$ in $J_j$, as illustrated in FIG. 3. $\Delta$ and $\Delta'$ determine two scene planes $\pi1$ and $\pi2$ in the 3D space, which induce two homographies $H_1$ and $H_2$ between $P_1$ and $P_2$. These plane-induced homographies can be computed given four point correspondences, i.e. the image point correspondences $x_i \leftrightarrow y_i$ and the epipoles $e_1 \leftrightarrow e_2$:

$$H_1 x_i \sim y_i \quad (1)$$

$$H_1 e_1 \sim e_2 \quad (2)$$

where ~ indicates projective equality up to an unknown scale. A similar set of equations provide $H_2$:

$$H_2 x_i \sim y_i \quad (3)$$

$$H_2 e_1 \sim e_2 \quad (4)$$

Degenerate configurations are discussed later.

Second we look at Constraints on Homographies Induced by Moving Triplets: During a pose transition, the motion of a triplet $\Delta \to \Delta'$ specifies a rigid motion of a scene plane $\pi_1 \to \pi_2$, which induces two homographies $H_1$ and $H_2$. These homographies define a mapping from $I_1$ (or $I_2$) to itself given by $$H \sim H_2^{-1} H_1 \quad (5)$$

As shown in FIG. 3, H first maps a point x on $I_1$ (or $I_2$) to x on $J_i$ (or $J_j$) through $\pi_1$, and then transforms it back to $I_1$ (or $I_2$) as H through $\pi_2$. It can be readily verified either algebraically or from FIG. 3 that points on the intersection of $\pi_1$ and $\pi_2$ are fixed during the mapping. Another fixed point under this mapping is the epipole $e_1$. Thus the homography H has a line of fixed points (the intersection line of $\pi_1$ and $\pi_2$) and a fixed point not on the line (the epipole $e_1$), which means that Statement 2: If a triplet of 3D points observed by two cameras undergo the same motion, then the homography H reduces to a planar homology, and hence two of its eigenvalues must be equal.

The equality of the two eigenvalues of H defines a consistency constraint on $H_1$ and $H_2$, imposing the assumption that the two cameras are observing the same scene plane motions—we describe this in more detail shortly. In the special case when the triplet is stationary, i.e., $I_1=I_2$ and Ji=Jj, this equality constraint is still satisfied since H reduces to an identity matrix, with all its eigenvalues equal to 1.

In practice, due to noise and subject-dependent differences, this constraint of equality of two eigenvalues for the same pose transition can be expressed by defining the following error function on H:

$$E(H) = \frac{|a - b|}{|a + b|} \quad (6)$$

where a, and b are the two closest eigenvalues of H. E(H) can be used to measure the similarity of motion of a triplet between two sequences, and the combination of E(H) for all triplets of noncollinear points provides a measure of similarity between pose transitions $I_1 \to I_2$ and $J_i \to J_j$:

$$\varepsilon(I_1 \to I_2, J_i \to J_j) = \underset{all\ \Delta_i}{\text{Median}}(E(H)) \quad (6)$$

$\epsilon(I_1 \to I_2, J_i \to J_j)$ is minimal for similar pose transitions, and is invariant to camera calibration matrix and viewpoint variations. Here we use median since it is a robust estimator of the mean of a random variable in the presence of possible outliers.

We now turn to Action Alignment and Recognition.

The goal of action alignment is to determine the correspondences between two video sequences $A=\{I_1 \ldots n\}$ and $B=\{J_1 \ldots m\}$ with matching actions, in our case based on the eigenvalue constraint described above. We align A and B by seeking the optimal mapping $\Psi: A \to B$ such that the cumulative similarity score $L'' S(i, \psi(i))$ is maximized, where $S(.)$ is the similarity of two poses. We define $S(.)$ based on matching pose transitions:

$$S(i,j) = \tau - \epsilon(I_{i \to r_1}, J_{j \to r_2}) \quad (7)$$

where $\tau$ is a constant threshold, and $r_1, s_1 \in [1,n]$ and $r_2, s_2 \in [1\ \mu m]$ are computed as follows:

$$\langle r_1, r_2 \rangle = \underset{r_1, r_2}{\text{argmin}}\{\underset{s_1, s_2}{\min} \varepsilon(I_{r_1 \to s_1}, J_{r_2 \to s_2})\} \quad (8)$$

The matching score of A and B is then defined by $$\mathcal{S}(A, B) = \max_\psi \sum_{i=1}^{n} S(i, \psi(i)) \qquad (9)$$

In other words, a pair of reference poses $(r_1, r_2)$ are found first by minimizing (9), and then two pose-transition sequences $A(r_1)$ and $B(r_2)$ are aligned by maximizing (10) using Dynamic Programming (DP). DP has been proven successful in sequence alignment, and has been applied in many areas, such as text processing and bioinformatics. The initialization $(r_1, r_2)$ can be further simplified by fixing $r_1$ and $s_1$, e.g., $r_1 = \lfloor n/4 \rfloor$ and $S_1 = \lfloor 3n/4 \rfloor$. The traced-back path of DP provides an alignment between two video sequence. Note that this may not be a one-to-one mapping, since there exists horizontal or vertical lines in the path (see FIG. 10 (c) for example). In addition, due to noise and computational error, different initializations may lead to slightly different valid alignment results. Here the action matching score rather than the alignment is what we are concerned with in action recognition.

Action recognition: Consider that we are given a target sequence $\{I_i\}$, and a database of reference sequences corresponding to known different actions, $\{J_i^1\}, \{J_i^2\}, \ldots, \{J_i^K\}$. To recognize the performed action by a subject in $\{I_i\}$, we use the technique in section II-D to align $\{I_i\}$ against all sequences in the database, and recognize it as the action with the highest matching score.

We now turn to Degenerate triplets.

A degenerate case occurs when three of the four points in a triplet are collinear. In general, we can simply discard these degenerate triplets, because in practice the number of non-degenerate triplets exceeds by far the degenerate triplets (Note that the total number of available triplets is $$\binom{n}{3}$$

for n body points). A special degenerate case is when the epipole is at or close to infinity, in which case all triplets are close to degenerate since the distance between three image points is negligible compared with their distances to the epipole. We solve this problem by transforming the image points in projective space, in a manner similar to Zhang et al. [see Reference 37]. The idea is to find the projective transformations P and P' for each image, such that after transformation the epipoles and transformed image points are not at infinity. Given corresponding image points $\{x_i\}$ and $\{y_i\}$, we first normalize and transform $\{x_i\}$ and $\{y_i\}$ by $T_1$ and $T_2$ respectively such that the RMS distance of the points from the origin is equal to 2 and the x and y coordinates of transformed points are ≥1. Then the resulted image points are transformed in projective space by applying the algorithm described in Zhang et al. [see Reference 37].

A discussion of why this works follows.

Any two homographies $H_1$ and $H_2$ induced by a pair of scene planes $\pi 1$ and $\pi 2$ can be combined as $H \sim H_2^{-1} H_1$, where H would always be a homology. An intriguing question that may arise is then the following: If this is true for any two scene planes, then why does the similarity measure proposed above work? and when would this constraint degenerate, i.e. fail to determine that the scene triplets undergo the same motion?

To answer these questions, let us re-examine what we do. A homography induced by a scene plane between two views requires a minimum of four points in order to be specified. We only have three points (i.e. the points of a triplet). However, in our case, the fundamental matrix F is known—we compute it using all the 11 body points across multiple frames. The key idea that makes it possible to compute the homographies is the fact that all the points on the baseline of the two cameras can be transferred via any scene plane. This is because all the points on the baseline are imaged at the two epipoles, and the epipoles can also be considered as the images of the intersection of the scene plane with the baseline. Therefore, when the fundamental matrix is known, one can use the epipoles as the fourth point for the homography induced by any scene plane. Next using the notations of FIG. 3, the homology H maps the points $x_i$ as follows:

$$Hx_i \sim H_2^{-1} H_1 x_i \qquad (5)$$

Next we look at action recognition based on fundamental ratios.

We turn first to Fundamental Ratios.

We next establish specific relations between homographies induced by world planes (determined by any triplet of non-collinear 3D points) and the fundamental matrix associated with two views. More specifically, we derive a set of new feature ratios that are invariant to camera intrinsic parameters for a natural perspective camera model of zero skew and unit aspect ratio. We then show that these feature ratios are projectively invariant to similarity transformations of the triplet of points in the 3D space, or equivalently invariant to rigid transformations of camera.

Proposition 1: Given two cameras $P_i \sim K_i[R_i|t_i]$, $P_j \sim K_j[R_j|t_j]$ with zero skew and unit aspect ratio, denote the relative translation and rotation from $P_i$ to $P_j$ as t and R respectively, then the upper left 2×2 submatrix of the fundamental matrix between two views is of the form $$F^{2\times 2} \sim \begin{bmatrix} \epsilon_{1st} t^s r_1^t & \epsilon_{1st} t^s r_2^t \\ \epsilon_{2st} t^s r_1^t & \epsilon_{2st} t^s r_2^t \end{bmatrix} \qquad (6)$$

where $r_k$ is the k-th column of R, the superscript, e.g. i, refers to $i^{th}$ element of a vector, and $\epsilon_{rst}$ for r, s, t=1, ..., 3 is a permutation tensor.

Remark 1 The ratios among elements of $F^{2\times 2}$ are invariant to camera calibration matrices $K_i$ and $K_j$.

The upper left 2×2 sub-matrices $F^{2\times 2}$ for two moving cameras could be used to measure the similarity of camera motions. That is, if two cameras perform the same motion (same relative translation and rotation during the motion), and $F_1$ and $F_2$ are the fundamental matrices between any pair of corresponding frames, then $F_1^{2\times 2} \sim F_2^{2\times 2}$.

This also holds for the dual problem when the two cameras are fixed, but the scene objects in both cameras perform the same motion. A special case of this problem is when the scene objects are planar surfaces, which is discussed next.

Proposition 2: Suppose two fixed cameras are looking at two moving planar surfaces, respectively. Let $F_1$ and $F_2$ be the two fundamental matrices induced by the two moving planar surfaces (e.g. by the two triplets of points). If the motion of the two planar surfaces is similar (differ at most by a similarity transformation), then $$F_1^{2\times 2} \sim F_2^{2\times 2} \qquad (7)$$

where the projective equality, denoted by ~, is invariant to camera orientation.

Here similar motion implies that plane normals undergo same motion up to a similarity transformation. The projective nature of the view-invariant equation in (2) implies that the elements in the sub-matrices on the both sides of (2) are equal up to an arbitrary non-zero scale factor, and hence only the ratios among them matter. We call these ratios the fundamental ratios, and as propositions 1 and 2 imply, these fundamental ratios are invariant to camera intrinsic parameters and viewpoint. To eliminate the scale factor, we can normalize both sides using $F_i = |F_i^{2\times 2}|/\|F_i^{2\times 2}\|_F$, where $|\cdot|$ refers to absolute value operator and $\|\cdot\|_F$ stands for the Frobenius norm. We then have $$\hat{F}_i = \hat{F}_2 \quad (8)$$

In practice, the equality may not exactly hold due to noise, computational errors or subjects' different ways of performing same actions. We, therefore, define the following function to measure the residual error:

$$\epsilon(\hat{F}_1, \hat{F}_2) = \|\hat{F}_1 - \hat{F}_2\|_F \quad (9)$$

We now turn to Action Recognition Using Fundamental Ratios.

We are given a video sequence $\{I_t\}$ and a database of reference sequences corresponding to K different known actions, DB=$\{J^1\}$, $\{J^2\}$, ..., $\{J^K\}$, where It and $J^k$ are labeled body points in frame t. Our goal is to identify the sequence $\{J^k\}$ from DB such that the subject in $\{I_t\}$ performs the closest action to that observed in $\{J^k\}$ Existing methods for action recognition consider an action as a whole, which usually requires known start and end frames and is limited when action execution rate varies. Some other approaches regard action as a sequence of individual poses, and rely on pose-to-pose similarity measures. Since an action consists of spatio-temporal data, the temporal information plays a crucial role in recognizing action, which is ignored in a pose-to-pose approach. We thus propose using pose transition. One can thus compare actions by comparing their pose transitions using fundamental ratios.

We now turn to Matching Pose Transition.

The 3D body structure of a human can be divided into triplets of body points (see FIG. 14), each of which determines a plane in the 3D space when the points are not collinear. The problem of comparing articulated motions of human body thus transforms to comparing rigid motions of body planes (triplets). According to proposition 2, the motion of a plane induces a fundamental matrix, which can be identified by its associated fundamental ratios. If two pose transitions are identical, their corresponding body point triplets have the same fundamental ratios, which provide a measure for matching two pose transitions.

First we look at Fundamental matrix induced by a moving triplet.

We are given an observed pose transition Ii→Ij from sequence $\{I_t\}$, and a second one $J^k \to J^k$ from sequence $\{J^k\}$. When Ii→Ij corresponds to $J^k \to J^k$, one can regard them as observations of the same 3D pose transition from two different cameras $P_1$ and $P_2$, respectively. There are two instances of epipolar geometry associated with this scenario: 1—The mapping between the image pair $(I_i, I_j)$ and the image pair $(J^k, J^k)$ is determined by the fundamental matrix F related to $P_1$ and $P_2$. The projection of the camera center of $P_2$ in or $I_j$ is given by the epipole $e_1$, which is found as the right null vector of F. Similarly the image of the camera center of $P_1$ in $J^k$ or $J^k$ is the epipole $e_2$ given by the right null vector of $F^T$. 2—The other instance of epipolar geometry is between transitioned poses of a triplet of body points in two frames of the same camera, i.e. the fundamental matrix induced by a moving body point-triplet, which we denote as $\mathcal{F}$. We call this fundamental matrix the inter-pose fundamental matrix, as it is induced by the transition of body point poses viewed by a stationary camera.

Let $\Delta$ be a triplet of non-collinear 3D points, whose motion lead to different projections on $I_i, I_j, J^k$ and $J^k$ as $\Delta_i$, $\Delta_j$, $\Delta_m^k$ and $\Delta_n^k$, respectively:

$$\Delta_i = \langle x_1, x_2, x_3 \rangle, \Delta_j = \langle x_1', x_2', x_3' \rangle, \Delta_m^k = \langle y_1, y_2, y_3 \rangle, \Delta_n^k$$
$$\langle y_1', y_2', y_3' \rangle. \quad (10)$$

Figure 12:
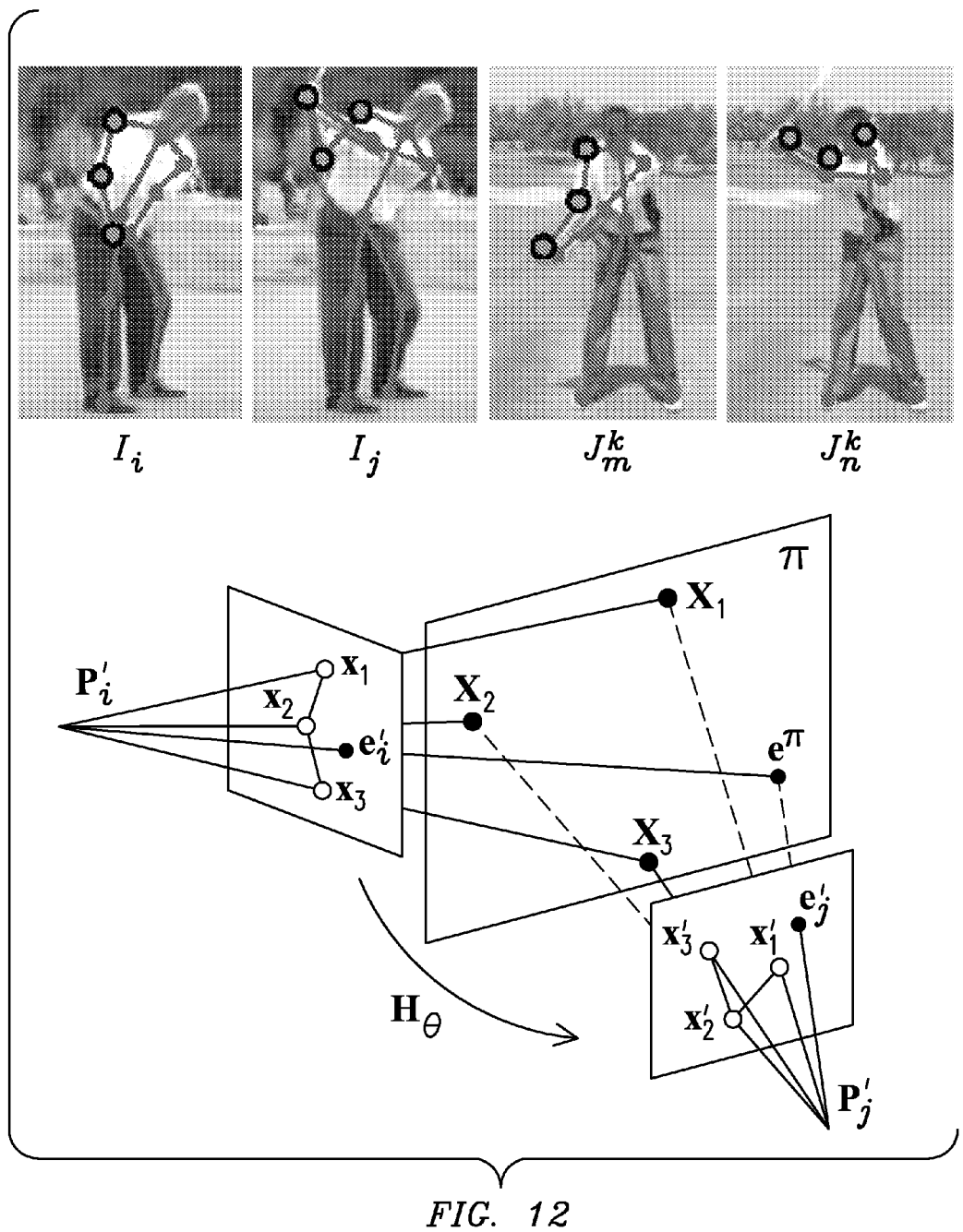
FIG. 12 shows the fundamental matrix induced by a moving plane.

$\Delta i$ and $\Delta j$ can be regarded as projections of a stationary 3D point triplet $(X_1, X_2, X_3)$ on two virtual cameras $P_i'$ and $P_j'$, as shown in FIG. 12. $(X_1, X_2, X_3)$ defines a world plane $\pi$, which induces a homography $H_{ij}$ between $P_j'$ and $P_j'$. As discussed earlier this homography can be computed from three point correspondences and the epipoles. If $e_i'$ and $e_j'$, are known, then $H_{ij}$ can be computed, and hence $\mathcal{F}_1$ induced by $\Delta_i$ and $\Delta_j$ can be determined using $$\mathcal{F}_1 \sim [e_j'] \times H_{ij}, \text{ or } \mathcal{F}_1 \sim H_{ij}^{-T}[e_i'] \times \quad (11)$$

Similarly, $\mathcal{F}_2$ induced by $\Delta_m^k$ and $\Delta_n^k$ is computed as $$\mathcal{F}_2 \sim [e_n'] \times H_{mn}, \text{ or } \mathcal{F}_2 \sim H_{mn}^{-T}[e_m'] \times \quad (12)$$

where $e_m'$ and $e_n'$ are the epipoles on virtual cameras $P_m'$ and $P_n'$, and $H_{mn}$ is the induced homography. The difficulty with (11) and (12) is that the epipoles $E_j'$, $e_j'$, $e_m'$, and $e_n'$ are unknown, and cannot be computed directly from the triplet correspondences. Fortunately, however, the epipoles can be closely approximated as described below.

Proposition 3: If the exterior orientation of $P_1$ is related to that of $P_2$ by a translation, or by a rotation around an axis that lies on the axis planes of $P_1$, then under the assumption: $e_i' = e_j' = e_1$, $e_m' = e_n' = e_2$, we have:

$$\epsilon(\hat{\mathcal{F}}_1, \hat{\mathcal{F}}_2) = 0 \quad (13)$$

Under more general motion, the epipoles are only approximately equal. However, this approximation is inconsequential in action recognition for a wide range of practical rotation angles. As described shortly, using equation (4) and the fundamental matrices $\mathcal{F}_1$ and $\mathcal{F}_2$ computed for every non-degenerate triplet, we can define a similarity measure for matching pose transitions.

Figure 4:
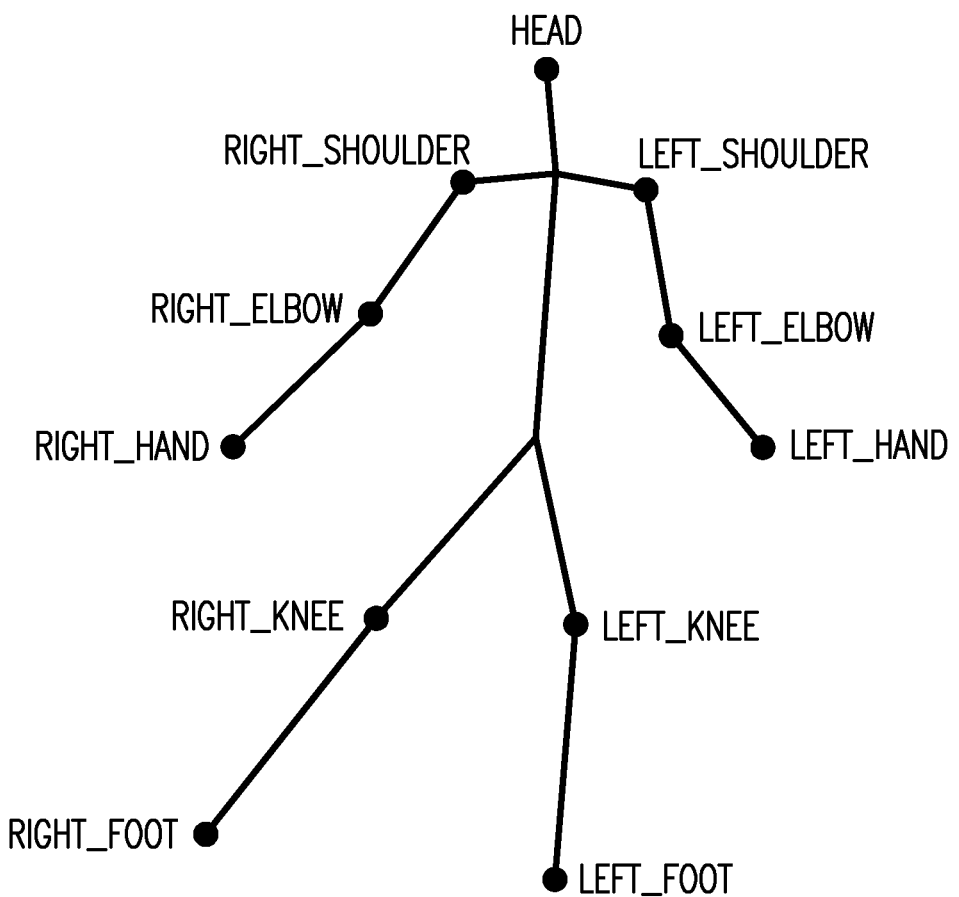
FIG. 4 shows a human body model with 11 body points.

Degenerate triplets: A homography cannot be computed from four correspondences if three points are collinear. Even when three image points are close to collinear the problem becomes ill-conditioned. We call such triplets as degenerate, and simply ignore them in matching pose transitions. This does not produce any difficulty in practice, since with 11 body point representation used herein (see FIG. 4), we obtain 165 possible triplets, the vast majority of which are in practice non-degenerate. A special case is when the epipole is close to or at infinity, for which all triplets would degenerate. We solve this problem by transforming the image points in projective space in a manner similar to Zhang et al. [see Reference 37]. The idea is to find a pair of projective transformations such that after transformation the epipoles and transformed image points are not at infinity. Note that these transformations do not affect the projective equality in Proposition 2.

Next we look at Algorithm for Matching Pose Transitions.

The algorithm for matching two pose transitions $\langle I_i, I_j \rangle$ and $\langle J_m^k, J_n^k \rangle$ is as follows:

Compute F, $e_1$, $e_2$ between image pair $\langle I_i, I_j \rangle$ and $\langle J_m^k, J_n^k \rangle$ using the method proposed in by Hartley, "In Defense of the Eight-Point Algorithm". *IEEE Transaction on Pattern Recognition and Machine Intelligence*, 19 (6): 580-593, 1997 [See Reference 40].

For each non-degenerate triplet $\Delta_l$ that projects onto $\Delta_i$, $\Delta_j$, $\Delta_m^k$ and $\Delta_n^k$ in $I_i$, $I_j$, $J_m^k$ and $J_n^k$ respectively, compute $\hat{\mathcal{F}}_1$, $\hat{\mathcal{F}}_2$ as described above from (11) and (12), and compute $e_l = \epsilon(\hat{\mathcal{F}}_1, \hat{\mathcal{F}}_2)$ from equation (9).

Compute the average error over all non-degenerate triplets using $$E(I_i \to I_j, J_m^k \to J_n^k) = \frac{1}{L} \sum_{\varepsilon=1 \ldots L} e_l$$

where L is the total number of non-degenerate triplets.

If $E(I_i \to I_j, J_m^k \to J_n^k) < E_0$ where $E_0$ is some threshold, then the two pose transitions are matched. Otherwise, the two pose transitions are classified as mismatched.

Now we turn to Action Recognition.

Given two sequences A and B, we match or align them by seeking the optimal mapping $\psi: A \to B$ such that the cumulative similarity score $S(i, \psi(i))$ is maximized, where $S(.)$ is the similarity of two pose transitions. This is solved by dynamic programming. We define $S(.)$ based on matching pose transitions as described above. To classify a given test sequence, we thus match it against each reference sequence in our action database, and classify it as the action with best matching score (see [Reference 41]). To ensure the approximation of epipoles discussed above, reference sequences from 2-3 viewpoints may be used for each action.

Experimental results for the eigenvalue method are now discussed.

We have validated our methods on both semi-synthetic and real data. Semi-synthetic data was generated from real motion-capture data using synthetic cameras with varying intrinsic parameters, different viewing directions, and varying noise levels. Our results on real data includes two sets of data: the IXMAS multiple view data set, and our own data set which consists of 56 video sequences of 8 actions (data available at http://cil.cs.ucf.edu/actionrecognition.html.

First we look at Analysis Based on Motion-Capture Data.

We generated our semi-synthetic data set using the CMU Motion Capture database (MoCap-http://mocap.cs.cmu.edu/), which consists of sequences of various actions in 3D, captured from real human actions. Here, we do not use the 3D points provided by the data, but merely project the 3D points onto images through synthetic cameras. In other words, we generate the images of 3D body points of a true person, using synthesized cameras and add Gaussian noise. Instead of using all the body points provided in the database, we selected a small subset of body points, which our experiments showed to be sufficient to represent human actions. The body model we employed consists of 11 joints and end points, including head, shoulders, elbows, hands, knees and feet (see FIG. 14). Experiments were then carried out on these generated 2D data to evaluate the performance of our method in recognizing pose transitions and actions in the presence of noise, varying viewpoints, different camera parameters, and subject-dependent differences.

Figure 5:
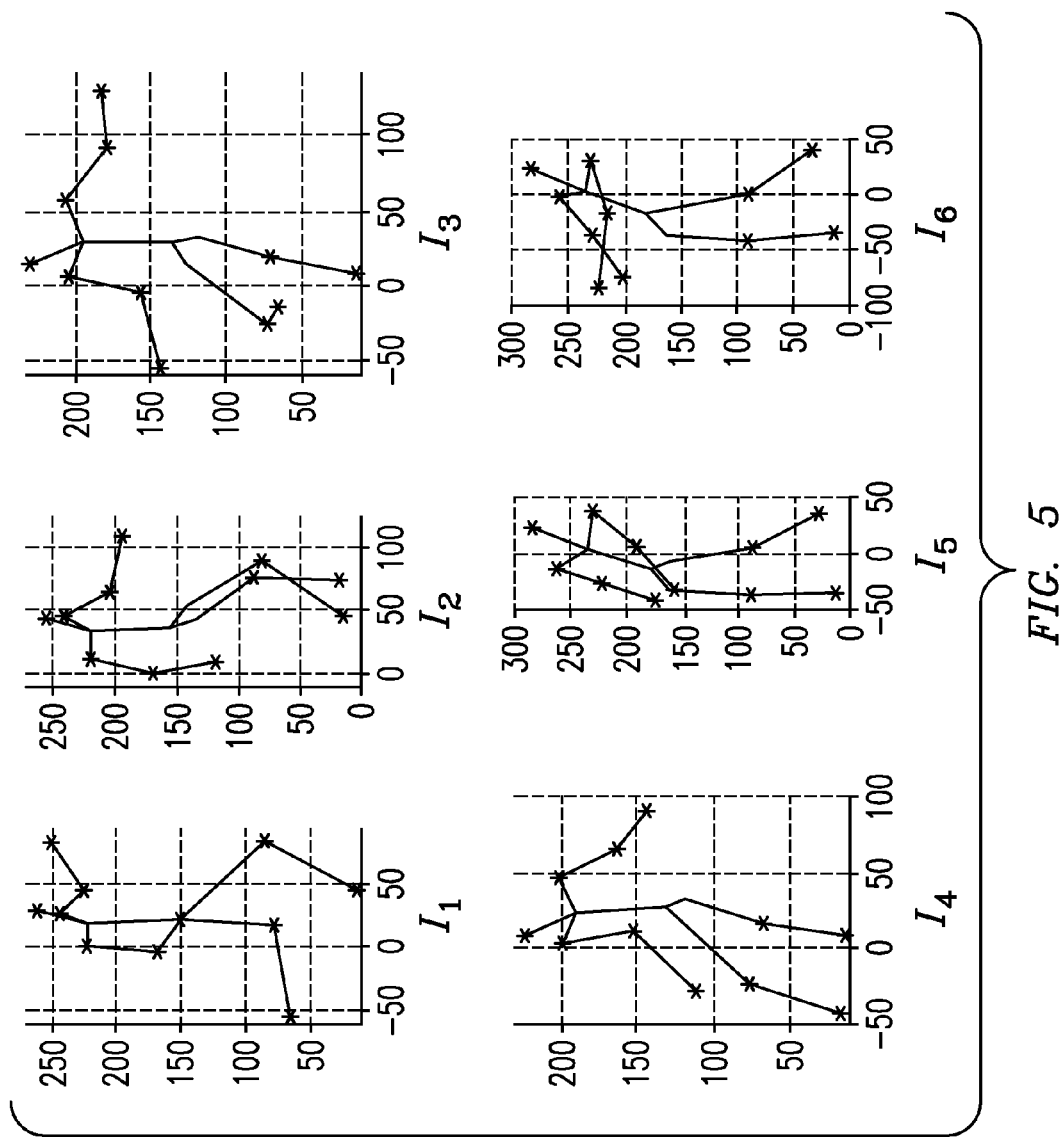
FIG. 5 shows data used to test robustness to noise.
Figure 6A:
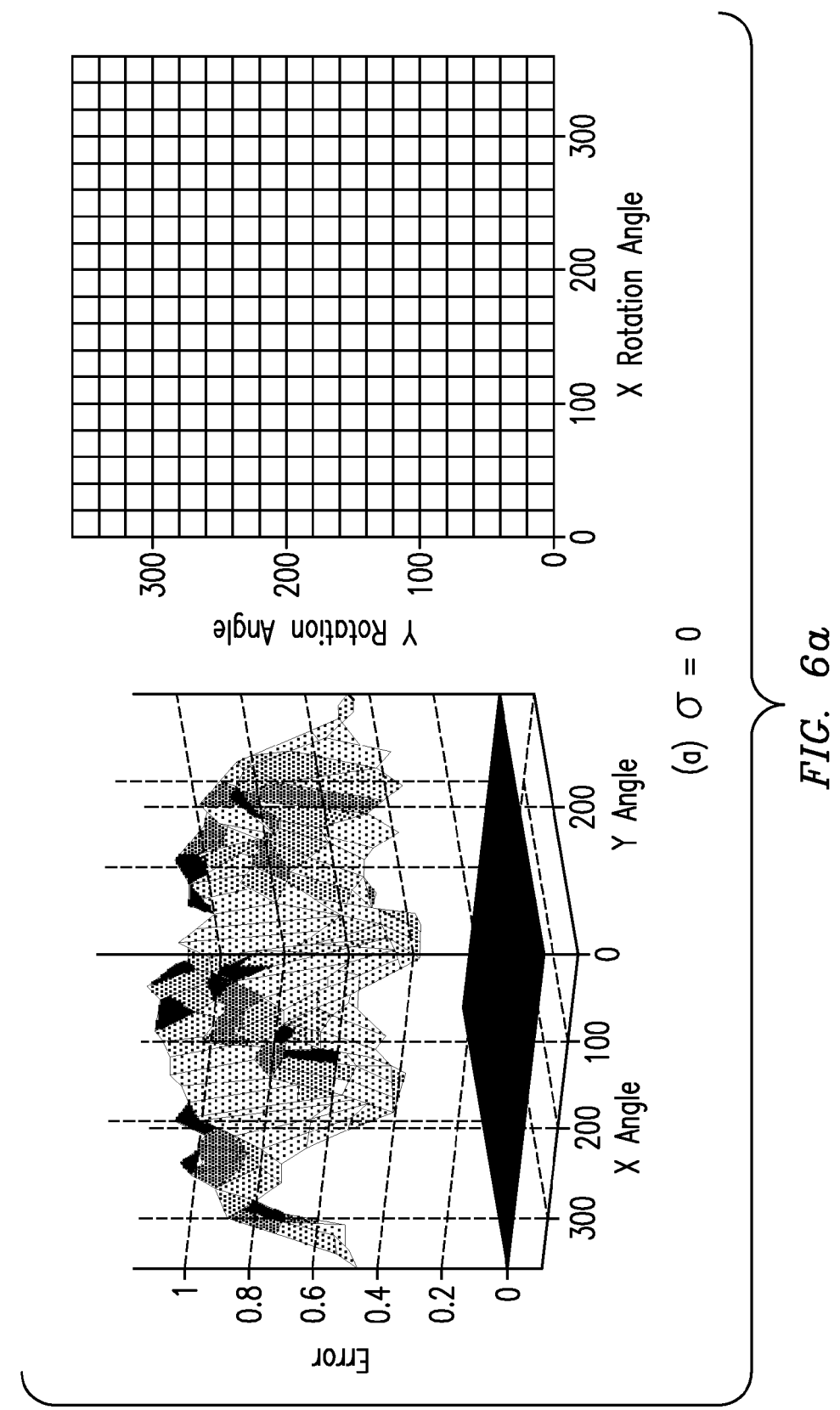
FIG. 6 shows robustness to noise plots.
Figure 6B:
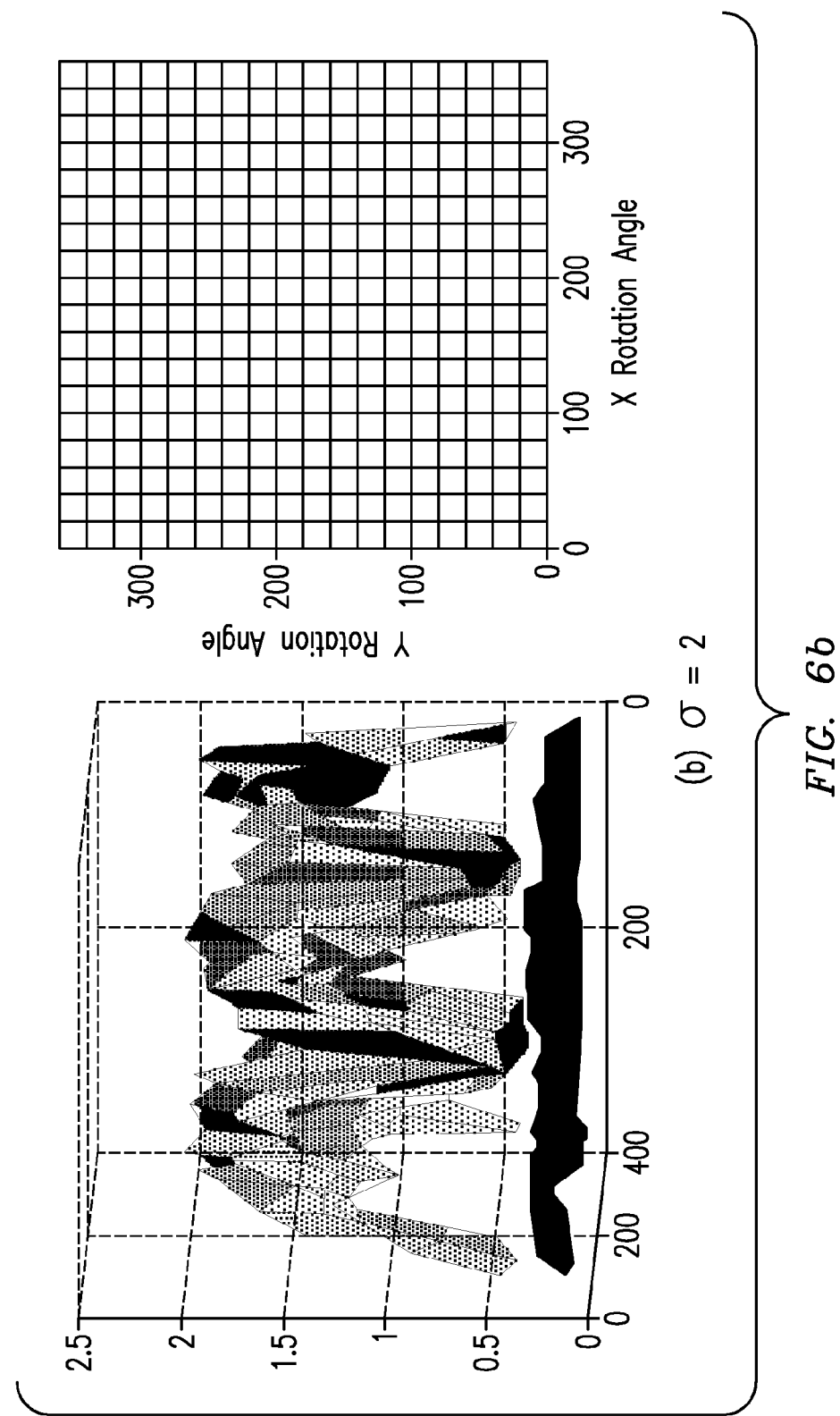
Figure 6C:
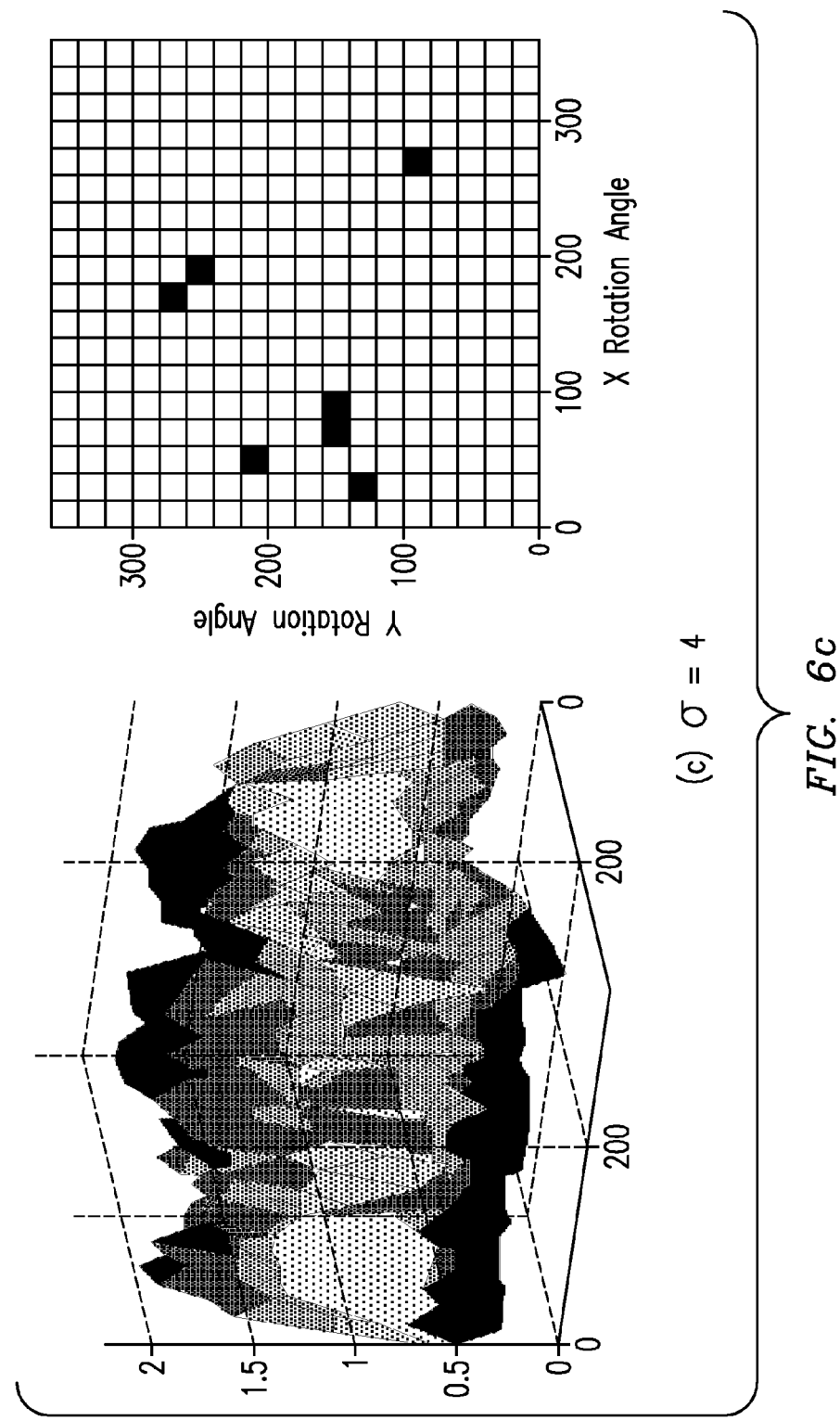
Figure 7:
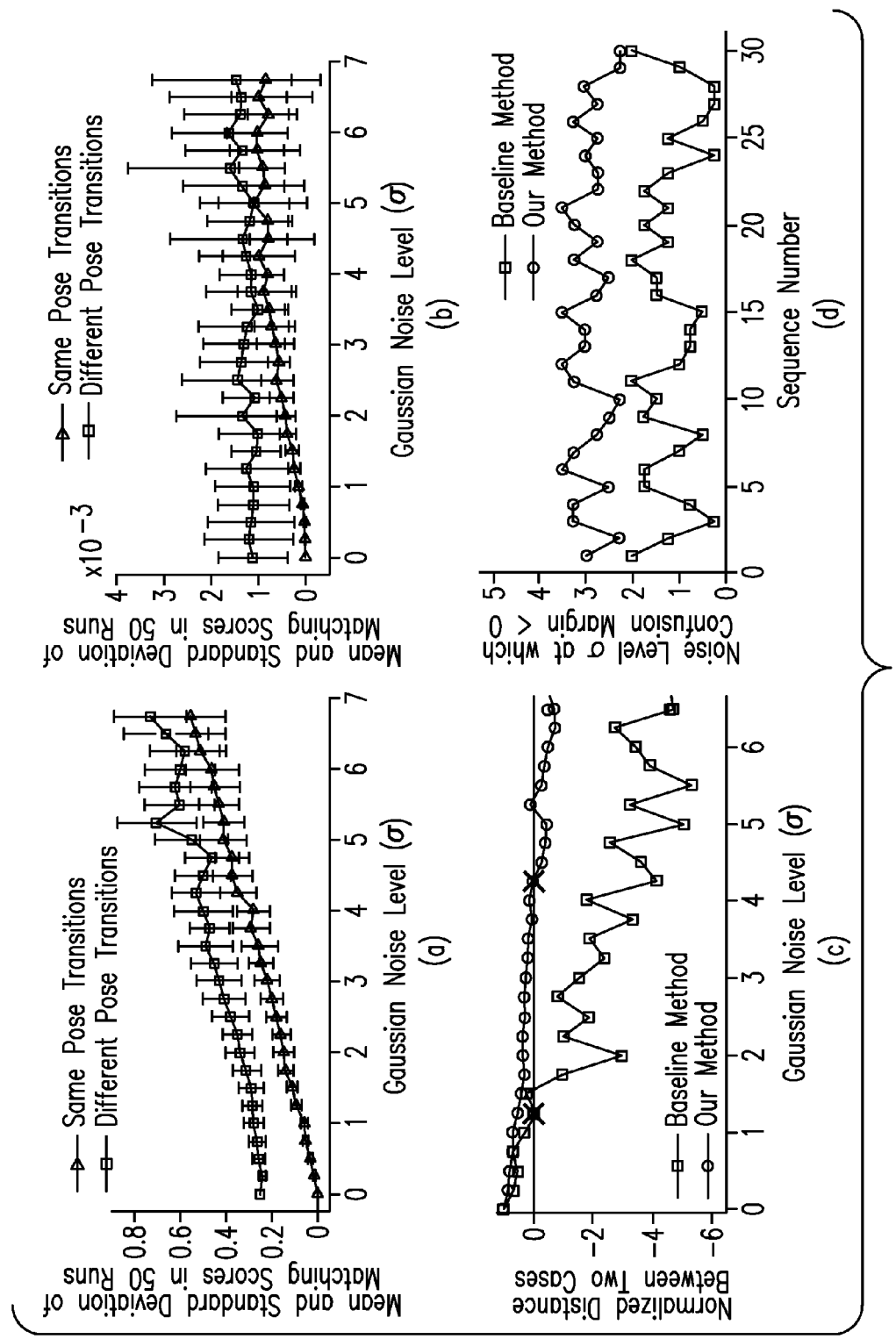
FIG. 7 shows a performance comparison.
Figure 8:
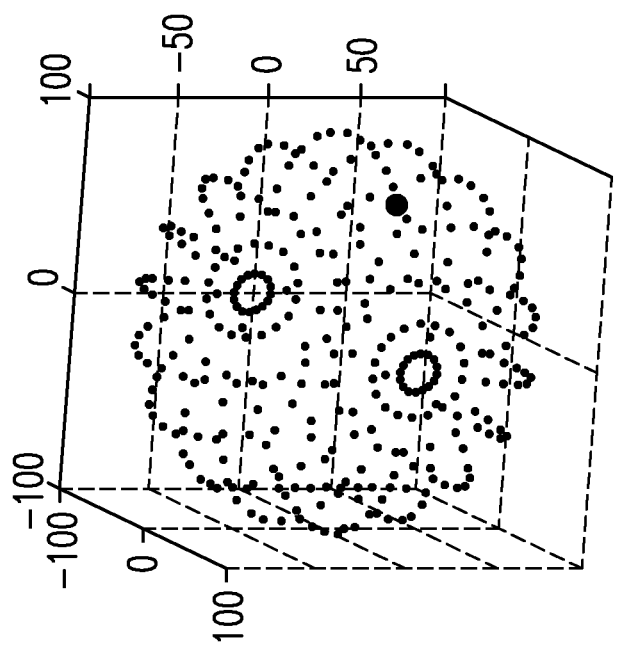
FIG. 8 shows the distribution of two cameras.
Figure 8:
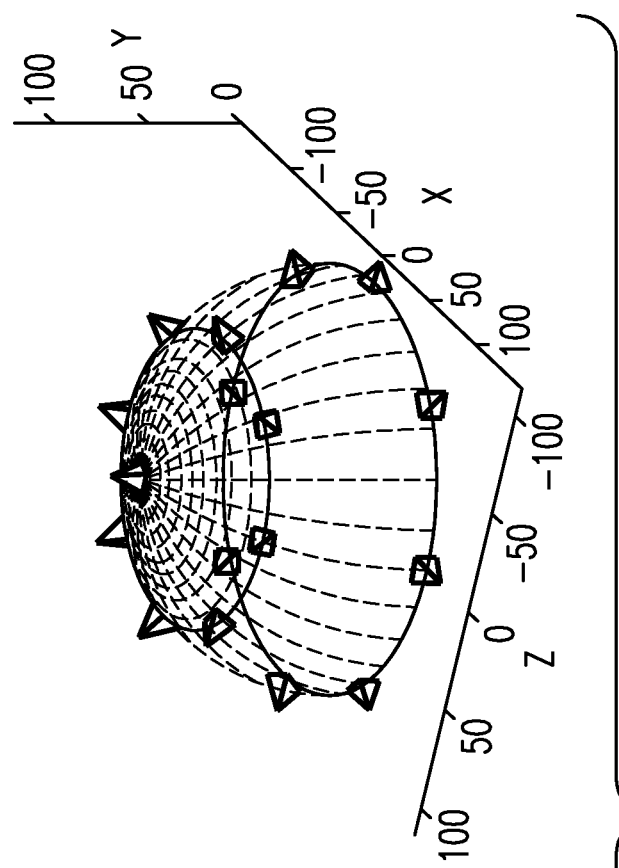

1) Testing View-invariance and Robustness to Noise: We selected two poses P1,2 in a KICK-BALL sequence and two poses Q1,2 from the GOLF-SWING sequence (see FIG. 5). These 3D poses are observed by two synthesized cameras: camera 1 with focal length f1=1000 looks at the origin of the world coordinate from a fixed location (marked by red color in FIG. 8 (a)), while camera 2 is obtained by rotating camera 1 around x and y axes of the world coordinates in increment of 10 degrees, and changing the focal length randomly in the range of 1000±300. FIG. 8 (a) shows all locations of camera 2 as blue points. Camera 1 observes $P_{1,2}$ as $I_{1,2}$ and camera 2 observes P1,2 and Q1,2 as I3,4 and I5,6, respectively (see FIG. 6). We then added Gaussian noise to the image points, with a increasing in steps of 0.25 from 0 to 6.75. Two error functions $\epsilon(I_1 \to I_2, I_3 \to I_4)$ and $\epsilon(I_1 \to I_2, I_5 \to I_6)$ were computed. For each noise level ($\sigma$), the above procedure was run for 100 independent trials and the mean and the standard deviation of both error functions were calculated. The error surfaces and confusion areas (black areas) with $\sigma=0, 2, 4$ are shown in FIG. 6 (a)-(c). Same and different pose transitions are readily distinguishable up until $\sigma=4.25$, i.e., up to possibly 12.75 pixel errors. Note that in this experiment the images of the subject have a width of around 150 pixels (see FIG. 5), which indicates that our method performs extremely well We compared our results with those obtained by a baseline method enforcing the equality of fundamental matrices and using the Sampson error. The plots are shown in FIG. 7. To compare the results in FIGS. 7 (a) and (b), we computed what we refer to as the confusion margin for each method, which is obtained by computing the distance $d(\sigma)$ between minimum of same pose error bars and maximum of different pose error bars at each noise level $\sigma$, normalized using $d'(\sigma)=d(\sigma)/d(0)$. If the confusion margin is negative, then the error bars overlap, indicating confusion in recognition. The curves for both methods are plotted in FIG. 7(c), and where they go negative are marked by red crosses. We repeated the experiments over pose transitions of 30 sequences of different actions. Average noise levels at which confusion occurs for the pose transitions of these 30 sequences are shown in FIG. 7(d), confirming a superior performance for our method compared with the baseline method.

2) Testing Action Recognition: We selected 5 actions from CMU's MoCap data set: walk, jump, golf swing, run, and climb. Each action is performed by 3 actors, and each instance of 3D action is observed by 17 cameras: the first camera was placed on $(x_0, 0, 0)$, looking at the origin of the world coordinate system, while the remaining 16 cameras were generated by rotating around the y-axis by and $\beta$ around the x-axis by $\alpha$, where $$\beta = \frac{\pi}{4}i, i = 0, \ldots, 7 \text{ and } \alpha = \frac{\pi}{4}j, j = 0, 1, 2$$

Figure 9:
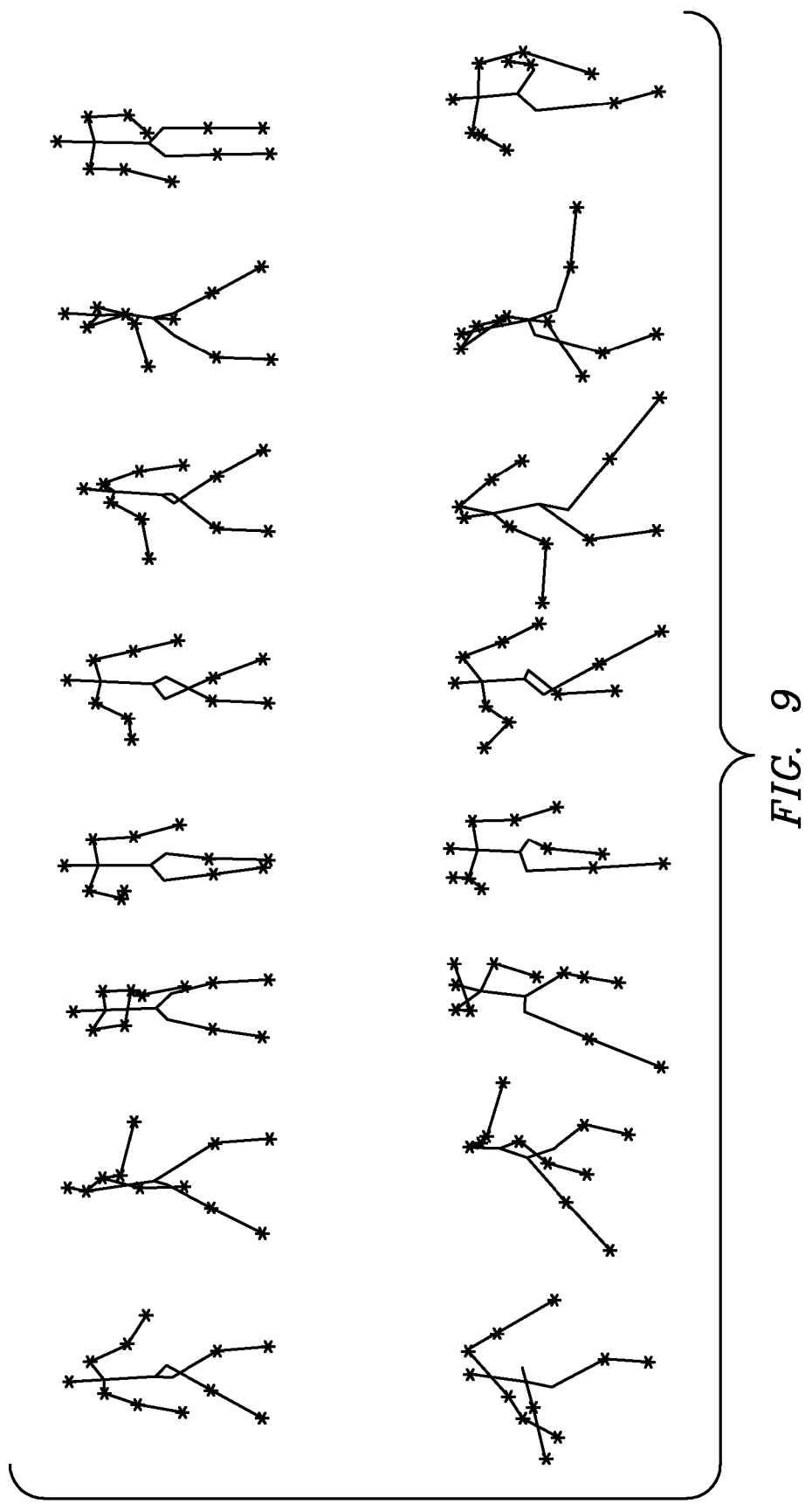
FIG. 9 shows a pose observed from 17 viewpoints.

(see FIG. 8 for the location of cameras). The focal lengths were also changed randomly in the range 1000±300. FIG. 9 shows an example of a 3D pose observed from 17 viewpoints. We then added Gaussian noise with $\sigma=3$ to the image points.

Our data set consists of totally 255 video sequences, from which we generated a reference Action Database (ADB) of 5 sequences, one sequence for each action. These sequences are all selected from viewpoint 1. The rest of the data set was used as test data, and each sequence was matched against all actions in the ADB and classified as the one with highest score. For each sequence matching, 10 random initialization are tested. The classification results are shown in Table I. For instance, the number in row 1, column 5 means that two of walking sequences are misclassified as climbing. Table II shows the confusion matrix for the same data set using the baseline method. The overall classification accuracy for our method is 92%, compared with 85% for the baseline method.

TABLE I

OUR METHOD: OVERALL ACCURACY ABOUT 92%.

| | Recognized as | | | | |
|---|---|---|---|---|---|
| Ground-truth | Walk | Jump | Golf Swing | Run | Climb |
| Walk | 45 | 1 | | 2 | 2 |
| Jump | 2 | 47 | | 1 | |
| Golf Swing | 1 | | 48 | 1 | |
| Run | | 3 | | 47 | |
| Climb | 6 | 2 | | | 42 |

TABLE II

BASELINE METHOD: OVERALL ACCURACY ABOUT 85%.

| | Recognized as | | | | |
|---|---|---|---|---|---|
| Ground-truth | Walk | Jump | Golf Swing | Run | Climb |
| Walk | 41 | 2 | 1 | 4 | 2 |
| Jump | 2 | 45 | | 1 | 2 |
| Golf Swing | 2 | 1 | 45 | 2 | |
| Run | 3 | 2 | 1 | 43 | 1 |
| Climb | 5 | 1 | 1 | 3 | 40 |

A further examination of the experiments on viewpoint changes is shown in Table III, from which we find that the accuracy for viewpoint 17 in our method is as low as 46.7%. This is most probably due to the severe distortions caused from viewpoint 17, which is directly above the subject. Ignoring this highly unlikely viewpoint, the average accuracy for other viewpoints is about 95%, which is remarkably good, despite the extreme viewpoint changes and variations in camera intrinsic parameters.

TABLE III

RECOGNITION ACCURACY FOR 17 DIFFERENT VIEWPOINTS

| | Viewpoints | | | | | | | | |
|---|---|---|---|---|---|---|---|---|---|
| | 1 | 2 | 3 | 4 | 5 | 6 | 7 | 8 | 9 |
| # of sequences | 10 | 15 | 15 | 15 | 15 | 15 | 15 | 15 | 15 |
| # of errors | 0 | 0 | 1 | 1 | 0 | 1 | 2 | 0 | 2 |
| Accuracy | 1.0 | 1.0 | .933 | .933 | 1.0 | .933 | .867 | 1.0 | .867 |

| | Viewpoints | | | | | | | |
|---|---|---|---|---|---|---|---|---|
| | 10 | 11 | 12 | 13 | 14 | 15 | 16 | 17 |
| # of sequences | 15 | 15 | 15 | 15 | 15 | 15 | 15 | 15 |
| # of errors | 1 | 1 | 0 | 2 | 1 | 1 | 0 | 8 |
| Accuracy | .933 | .933 | 1.0 | .933 | .867 | .933 | 1.0 | .467 |

We now look at Tests on Real Data.

1) Our own data set: We evaluated our method on a data set of real video sequences. To best simulate the situations in real life, we collected these videos from the Internet, coming from a variety of sources. The collected data set consists of 56 sequences of 8 actions: 4 of ballet fouettes, 12 of ballet spin, 6 of push-up exercise, 8 for golf swing, 4 of one-handed tennis backhand stroke, 8 of two-handed tennis backhand stroke, 4 of tennis forehand stroke, and 10 of tennis serve. Each action is performed by different subjects, and the videos are taken by different unknown cameras from various viewpoints collected over the Internet. In addition, videos in the same group (action) may have different starting and ending times, thus may be only partially overlapped. Subjects also perform the same action in different ways and at different speeds. Self-occlusion and minor camera motions also exist in many of the sequences, which provide a good test of the robustness of our method.

Figure 10:
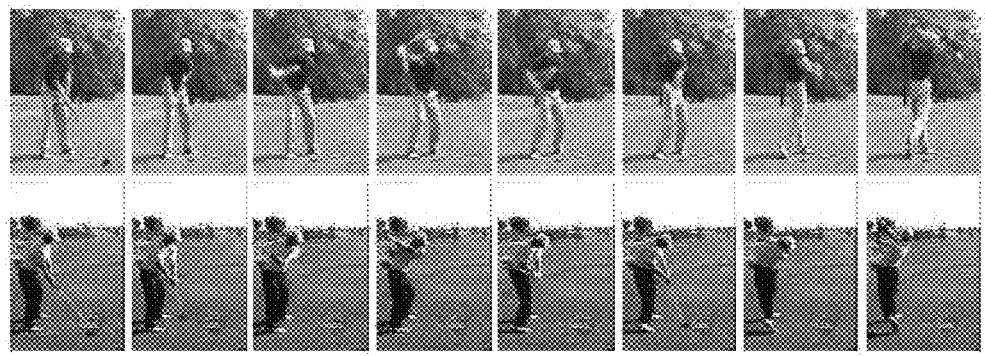
FIG. 10 shows two examples of alignment
Figure 10:
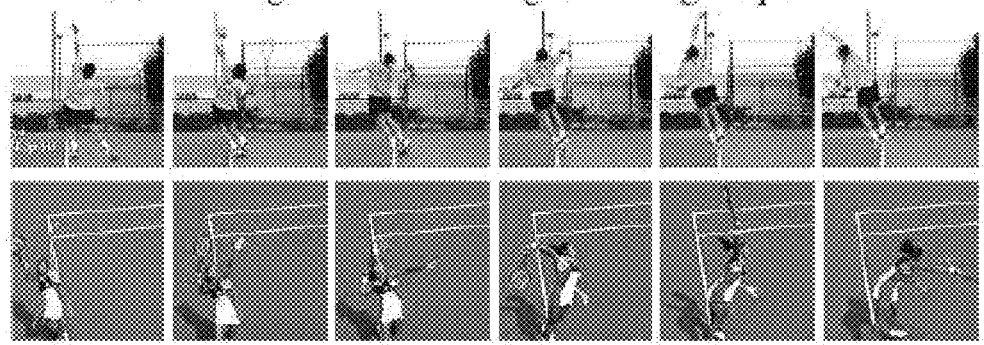
Figure 10:
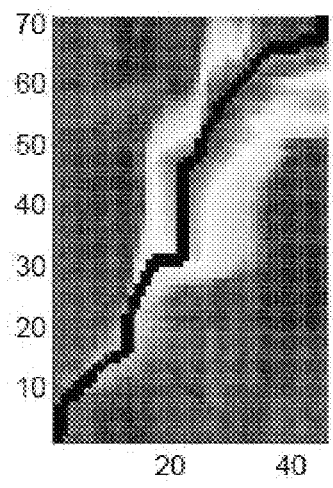
Figure 10:
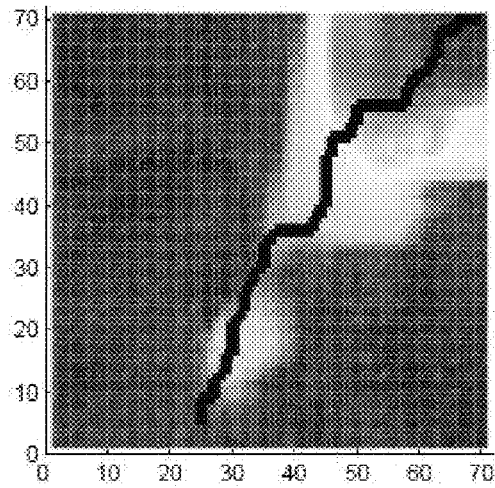

1.1) Aligning Two Actions. We tested our action alignment approach for numerous sequences in our database, two of which are shown in FIG. 10. These test sequences had different lengths or different starting and ending points of action. FIGS. 10 (a) and (b) show the two examples of aligned sequences. In the first example, two sequences of different lengths (the length of the upper sequence is 46 frames, and the lower one is 71 frames) are aligned, in which two players are performing golf swing at different speeds. The alignment result is shown in FIG. 10 (a): the first two rows show some matched poses, and the frame-to-frame mapping of two sequences are displayed in the third row. In the second example, shown in FIG. 10 (b), two sequences of a tennis serve-actions are aligned: the two sequences are roughly of the same length but different start and ending frames in terms of player's pose.

The accumulation matrices and the back-tracked paths in dynamic time warping for these two examples are shown in FIGS. 10 (c) and (d), respectively. The thresholds used in these examples were $\tau=0.3$ and $\tau=0.4$. The choice of $\tau$ reflects our estimate of the matching noise. The examples with different $\tau$ values shown here are only for demonstration purposes. We found that dynamic time warping in general performs well for a large range of values of $\tau$ and provides good-enough solutions for action recognition using our method. As stated in section II-D, we set $\tau$ to a constant value of 0.3 throughout our experiments.

Figure 11:
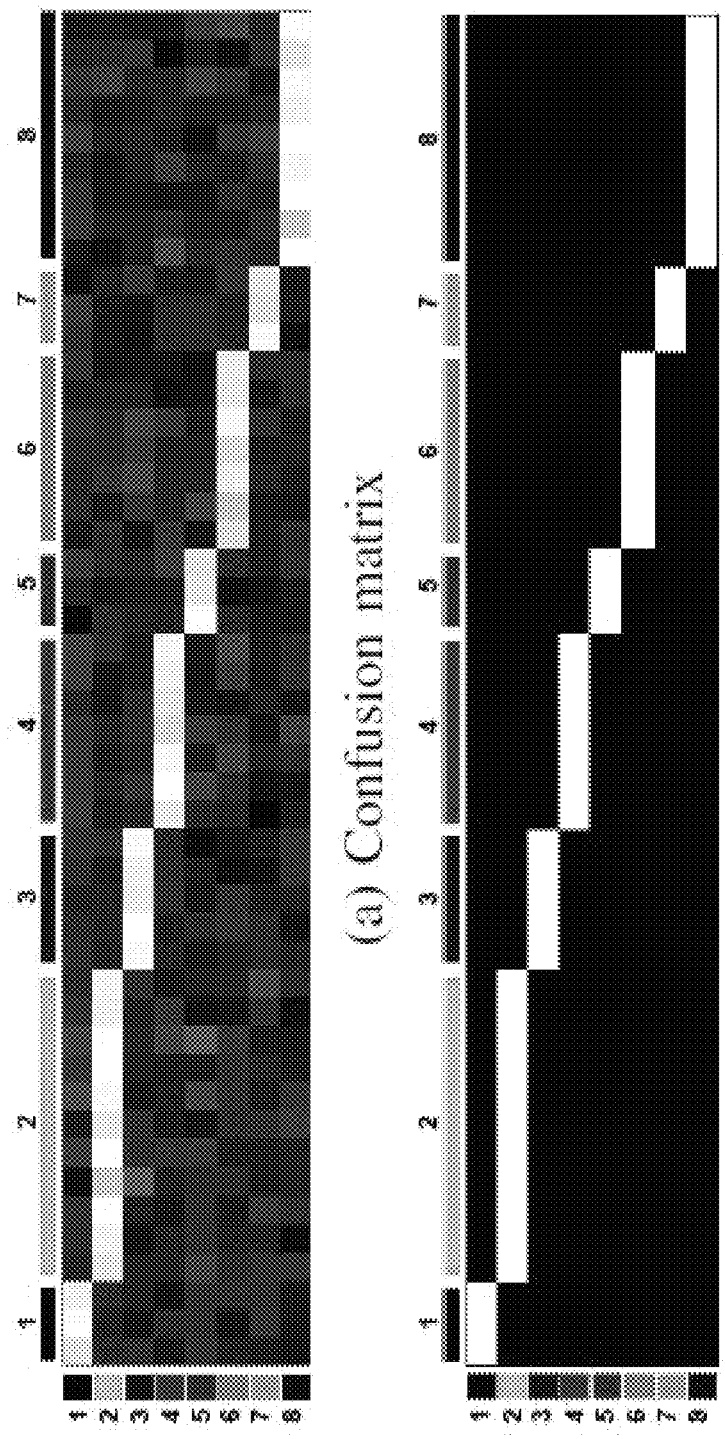
FIG. 11 shows result of action recognition based on the confusion matrix.

1.2) Results on Action Recognition. We built an action database (ADB) by selecting one sequence for each action. The other sequences were used as test sequences, and were matched against all actions in ADB. The recognition result is based on the highest matching score for each sequence. We show the confusion matrix in FIG. 11 (a), where light colors represent similar actions and dark colors represent dissimilar actions. The recognition result is shown in FIG. 11 (b) (100% match), where the black block in each column indicates the recognized action for each test sequence.

2) IXMAS Data Set: We tested our methods on IXMAS data set, which is a multiple view data set with 13 daily-live motions, each performed 3 times by 11 actors. We segmented all sequences into different actions based on the provided ground-truth segmentation, and tested on actions {1 2 3 4 5 8 9 10 11 12}, and we applied our method on all actors except for "Pao" and "Srikumar". We took the actor "andreas" out of the data set, and used "andreas 1" under camera view "cam1" as the reference for all actions. The remaining sequences performed by all other actors were used as test data. Note that our reference and test sequences are all single-view, thus multiple view information in the data set is not used in our experiments. The global threshold τ=0.3 is used in our experiments, and the recognition results are shown in Table IV. The average recognition rate is 90.23%, which is comparable to the result of 93.33% using MHV given that we do not use multiple images and rely only on one view.

TABLE IV

RECOGNITION RATE FOR IXMAS DATA.

| | Action | | | | |
|---|---|---|---|---|---|
| | 1 | 2 | 3 | 4 | 5 |
| Recognition Rate % | 89.6 | 94.8 | 85.2 | 91.9 | 91.1 |
| | Action | | | | |
| | 8 | 9 | 10 | 11 | 12 |
| Recognition Rate % | 85.2 | 92.6 | 91.9 | 90.4 | 89.6 |

ACTIONS ARE:
1 = CHECK WATCH,
2 = CROSS ARMS,
3 = SCRATCH HEAD,
4 = SIT DOWN,
5 = GET UP,
8 = WAVE,
9 = PUNCH,
10 = KICK,
11 = POINT,
12 = PICK UP

Figure 17:
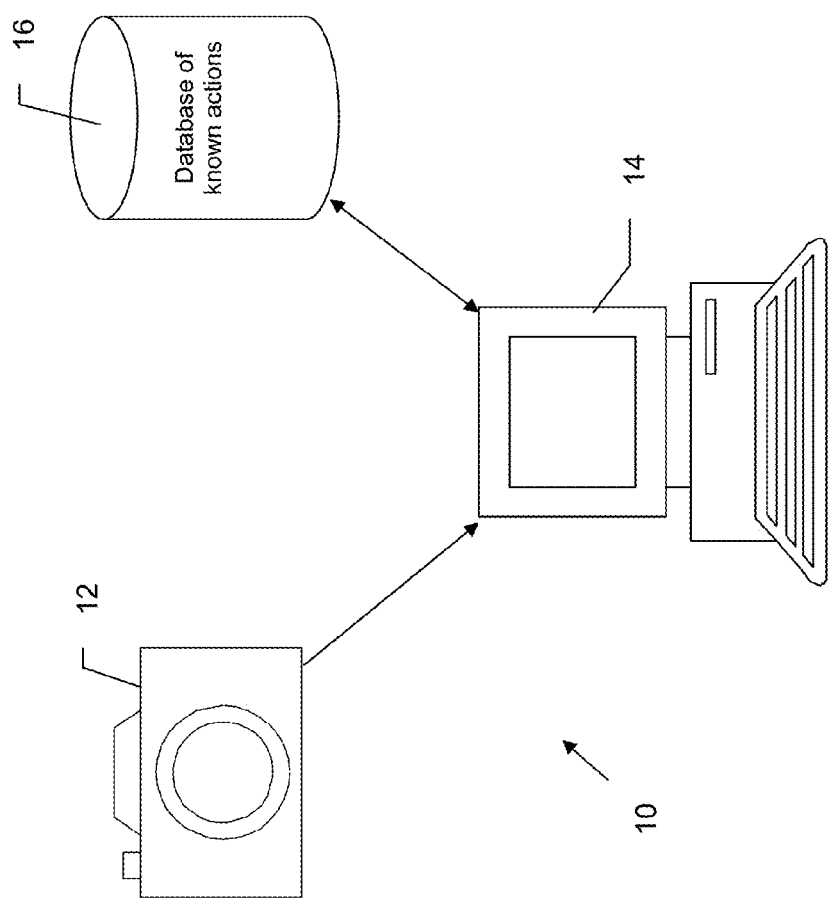
FIG. 17 is an overview of an embodiment of a hardware architecture of the present invention.

FIG. 17 illustrates an example of the hardware components which may be used to implement the present invention. In an example embodiment, the system 10 includes an input camera device 12 (e.g., a standard or specialized action recognition camera) and a computing device 14 having at least one processor, a memory coupled to the processor, a program residing in the memory which implements the methods of the present invention, in communication with a database of known actions 16. The database 16 includes a sequence of 2D poses for each known action. Data for the database may be collected from a variety of available data/sources or prepared specifically for a particular application by recording action data and saving it to the database.

Figure 18:
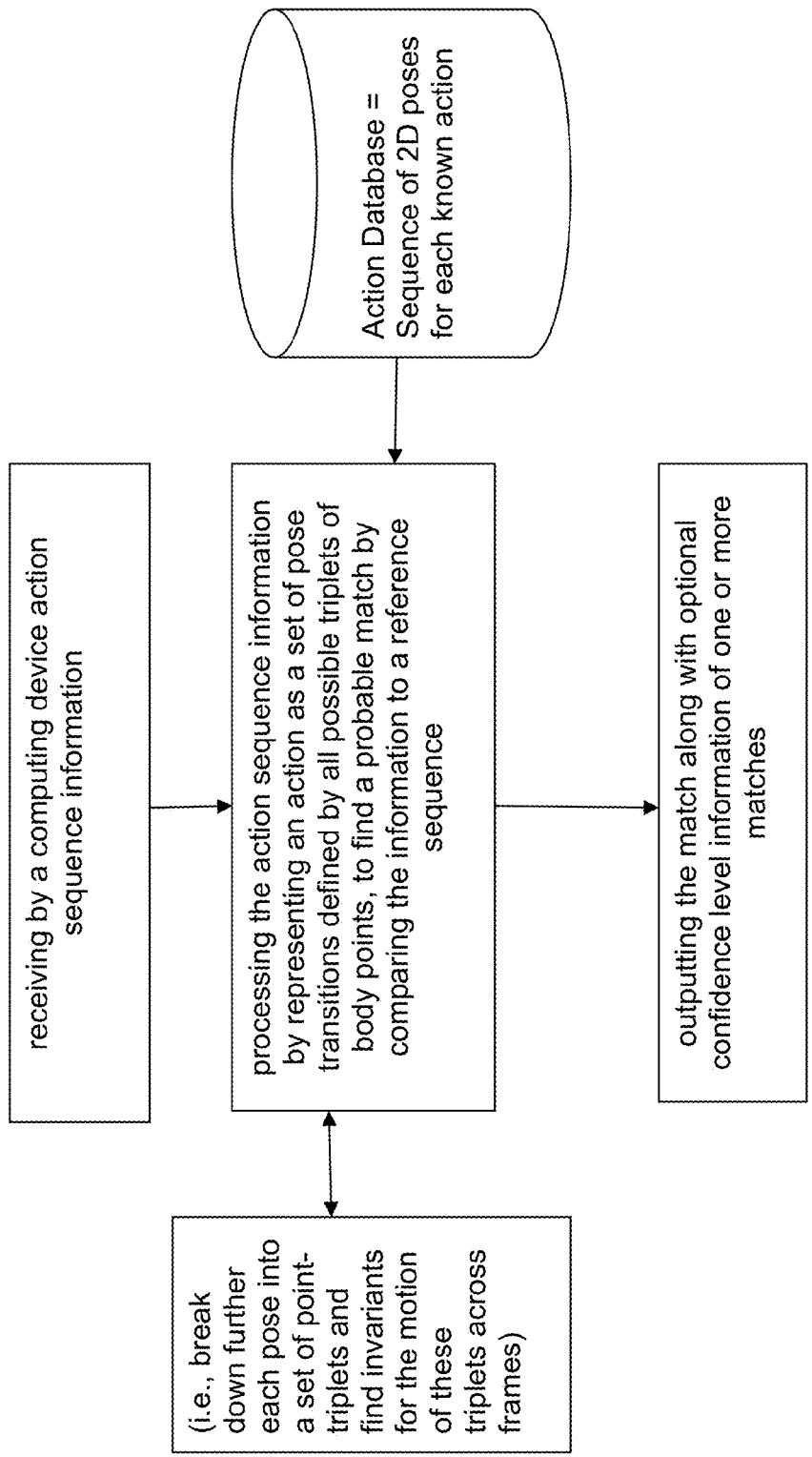
FIG. 18 depicts a flowchart of an embodiment of a method of the present invention.

FIG. 18 is a flow chart of a method embodying this invention. In an example embodiment, the method comprises (1) receiving by the computing device action sequence information (in real time or previously recorded) as a set of labeled points for each image, wherein the received information requires only a single camera view, and wherein a human body pose P is generally represented by M body points: P={mi=1...M} obtained by using articulated object tracking techniques, (2) processing the action sequence information using the methods of the invention (i.e., solve the action recognition problem by representing an action as a set of pose transitions defined by all possible triplets of body points, i.e., break down further each pose into a set of point-triplets and find invariants for the motion of these triplets across frames) to find a probable match by comparing the information to a reference sequence (e.g., a sequence of 2D poses for each known action maintained in an action database of actions), wherein the known actions require only one example view of each action in the database, (3) outputting the match along with optional confidence level information of one or more matches (e.g., outputting the confidence level as a percentage or, if more than one probable match is located, ranking the matches by confidence level). The matching score is based on pose transitions of all possible triplets of body points.

The output from the method may then be further used in many practical applications including therapy, sports enhancement and techniques, security, etc. For example, security cameras may capture action sequences and input this information into a computing device that recognizes the action by the method of the present invention and outputs an alarm if a recognized action is a security concern. Similarly, for therapy, a camera may capture action sequences of a patient and input this information into a computing device that recognizes the action by the method of the present invention and outputs feedback to the patient or therapist based on the recognized actions.

We now look at experimental results for the fundamental ratio method.

1. Analysis based on motion capture data. We generated our data based on the CMU Motion Capture Database, which consists of 3D motion data for a large number of human actions. We generated the semi-synthetic data by projecting 3D points onto images through synthesized cameras. In other words, our test data consist of video sequences of true persons, but the cameras are synthetic, resulting in semi-synthetic data to which various levels of noise were added. Instead of using all body points provided in CMU's database, we employed a body model that consists of only eleven points, including head, shoulders, elbows, hands, knees and feet (see FIG. 2). This model is also used in the experiments in section 4.2.

Figure 13:
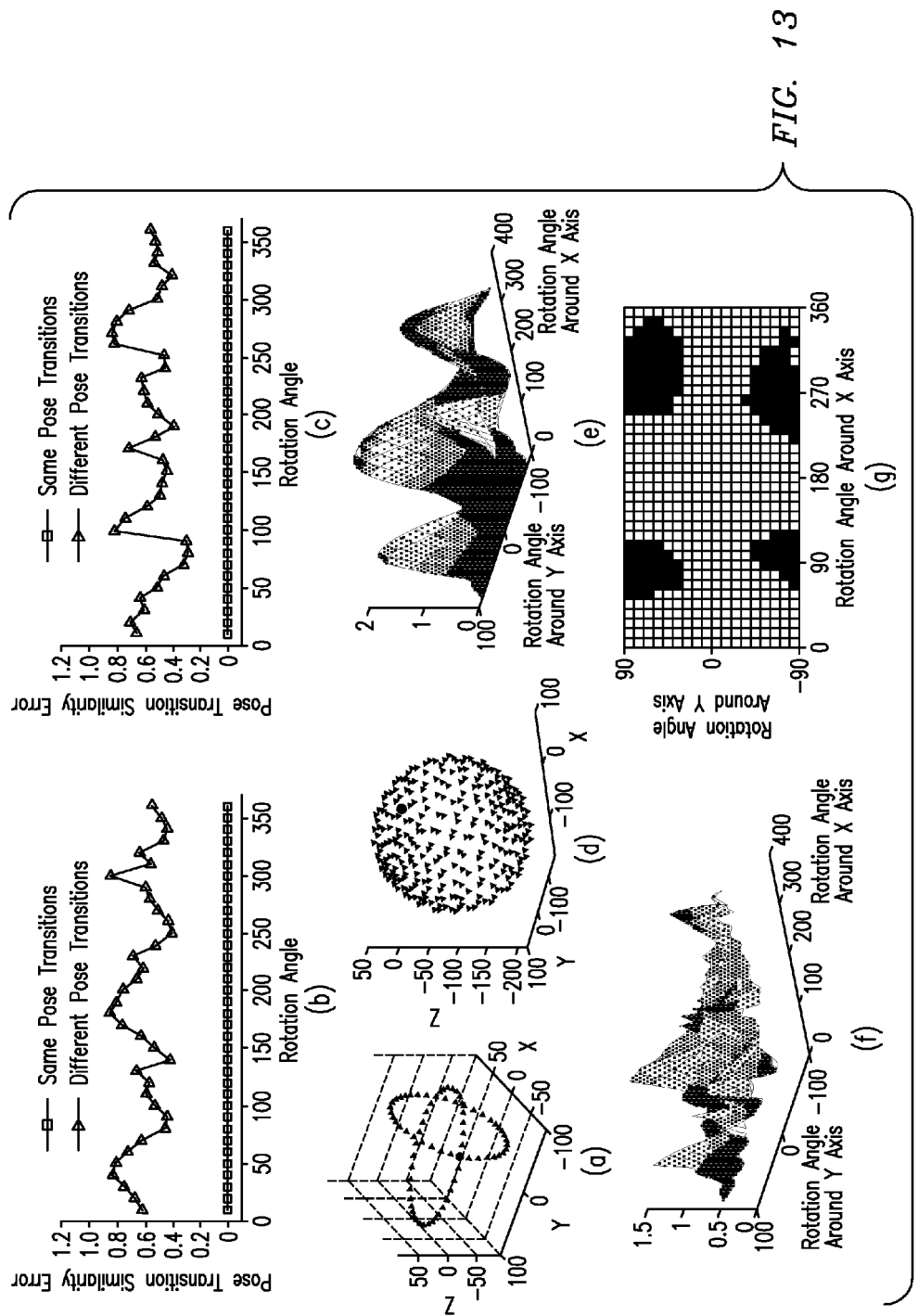
FIG. 13 shows analysis view of invariance.

1.1 Testing View Invariance. We selected four different poses P1,P2,P3,P4 from a golf swinging sequence (see FIG. 2). We then generated two cameras as shown in FIG. 3 (a): camera 1 was placed at an arbitrary viewpoint (marked by red color), with focal length f1=1000; camera 2 was obtained by rotating camera 1 around an axis on x-z axis plane of camera 1 (colored as green), and a second axis on y-z axis plane of camera 1 (colored as blue), and changing focal length as f2=1200. Let I1 and I2 be the images of poses P1 and P2 on camera 1 and I3,I4,I5 and I6 the images of poses P1,P2,P3 and P4 on camera 2, respectively. Two sets of pose similarity errors were computed at all camera positions shown in FIG. 13 (a): $\epsilon(I_1 \rightarrow I_2, I_3 \rightarrow I_4)$ and $\epsilon(I_1 \rightarrow I_2, I_5 \rightarrow I_6)$. The results are plotted in FIGS. 3 (b) and (c), which show that, when two cameras are observing the same pose transitions, the error is zero regardless of their different viewpoints, confirming proposition 3.

Similarly, we fixed camera 1 and moved camera 2 on a sphere as shown in FIG. 3 (d). The errors $\epsilon(I_1 \rightarrow I_2, I_3 \rightarrow I_4)$ and $\epsilon(I_1 \rightarrow I_2, I_5 \rightarrow I_6)$ are shown in FIGS. 3 (e) and (f). Under this more general camera motion, the pose similarity score of corresponding poses is not always zero, since the epipoles in equations (5) and (6) are approximated. However, this approximation is inconsequential in most situations, because the error surface of different pose transitions is in general above that of corresponding pose transitions. FIG. 3 (h) shows the regions (black colored) where approximation is invalid. These regions correspond to the situation that the angles between camera orientations is around 90 degrees, which usually implies severe self-occlusion and lack of corresponding points in practice. The experiments on real data in section 4.2 also show the validity of this approximation under practical camera viewing angles.

Figure 14:
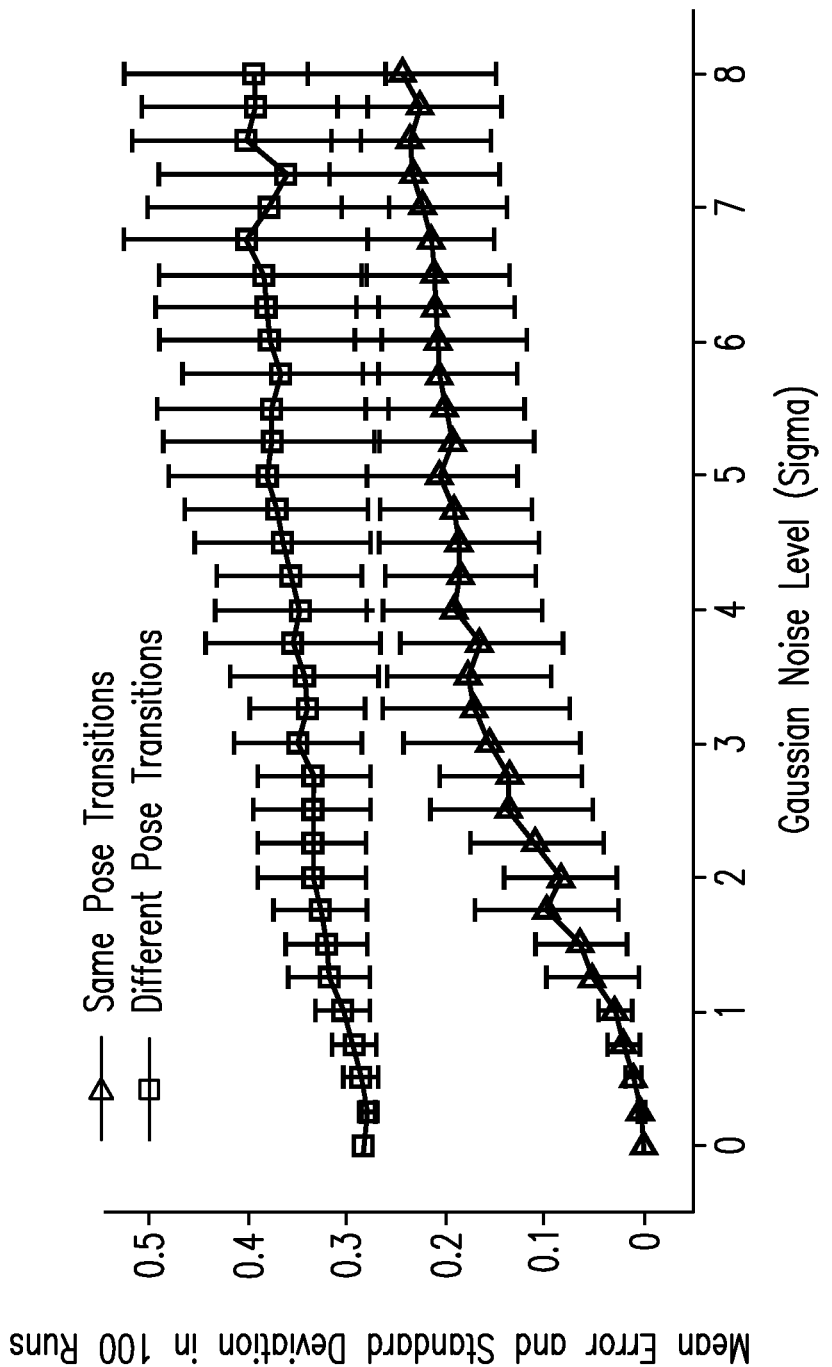
FIG. 14 shows robustness to noise.

1.2 Testing Robustness to Noise. Without loss of generality, we used the four poses in FIG. 2 to analyze the robustness of our method to noise. Two cameras with different focal lengths and viewpoints were examined. As shown in FIG. 14, I1 and I2 are the images of poses P1 and P2 on camera 1 and I3,I4,I5 and I6 are the images of P1,P2,P3 and P4 on camera 2. We then added Gaussian noise to the image points, with σ increasing from 0 to 8. The errors $\epsilon(I_1 \to I_2, I_3 \to I_4)$ and $(I_1 \to I_2, I_5 \to I_6)$ were computed. For each noise level, the experiment was repeated for 100 independent trials, and the mean and standard deviation of both errors were calculated (see FIG. 14). As shown in the results, the two cases are distinguished unambiguously until σ increases to 4.0, i.e., up to possibly 12 pixels. Note that the image sizes of the subject were about 200×300, which implies that our method performs remarkably well under high noise.

Figure 15:
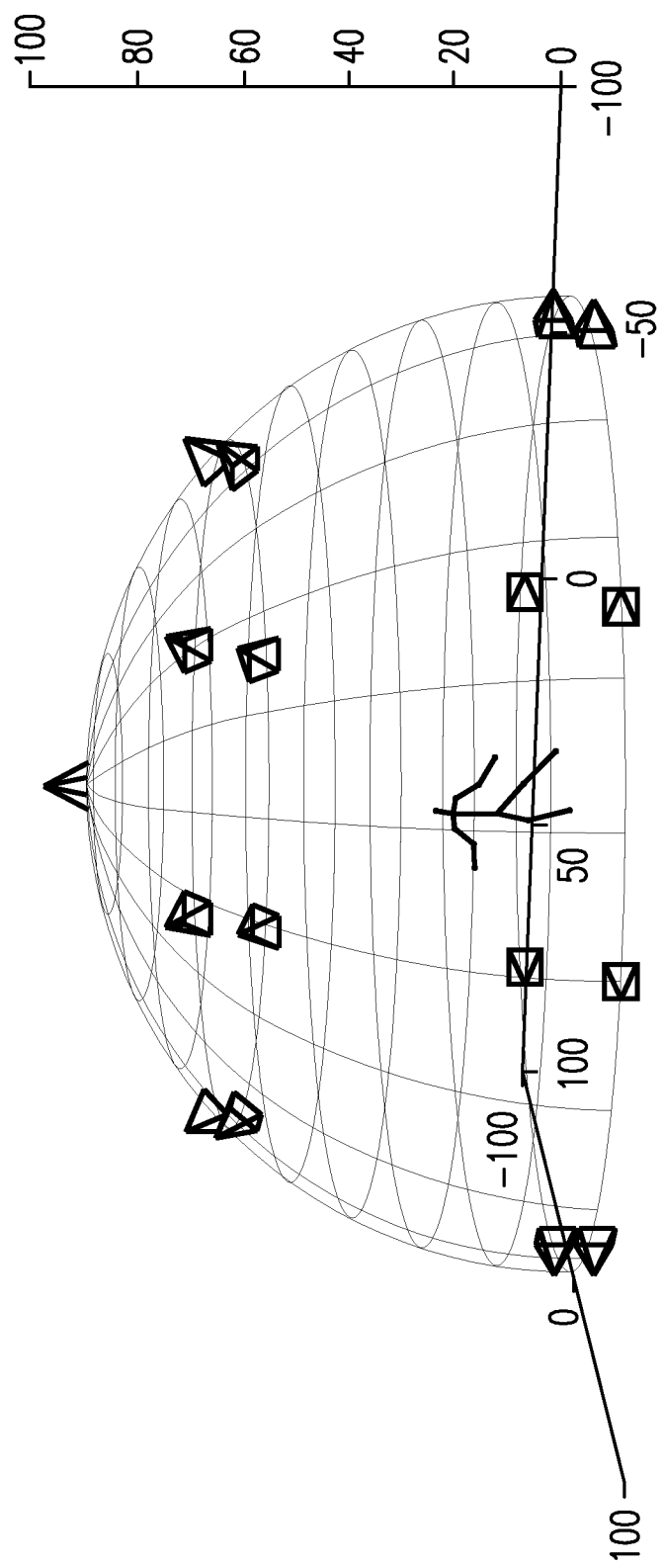
FIG. 15 shows distribution of cameras.

1.3 Performance in Action Recognition. We selected 5 classes of actions from CMU's MoCap dataset: walk, jump, golf swing, run, and climb. Each action class is performed by 3 actors, and each instance of 3D action is observed by 17 cameras, as shown in FIG. 15. The focal lengths were changed randomly in the range of 1000±300. FIG. 9 shows an example of a 3D pose observed from 17 viewpoints.

Our dataset consists of totally 255 video sequences, from which we generated a reference action Database (DB) of 5 video sequences, i.e. one video sequence for each action class. The rest of the dataset was used as test data, and each sequence was matched against all actions in the DB and classified as the one with highest score. For each sequence matching, 10 random initializations were tested and the best score was used. The overall classification accuracy for all viewpoints is 81.60%, with very low accuracy at viewpoints 11, 14, 15, 16, which correspond to severe viewing angles from below or above the actor. Excluding these viewpoints, the classification accuracy increases to 94.21%.

Figure 16:
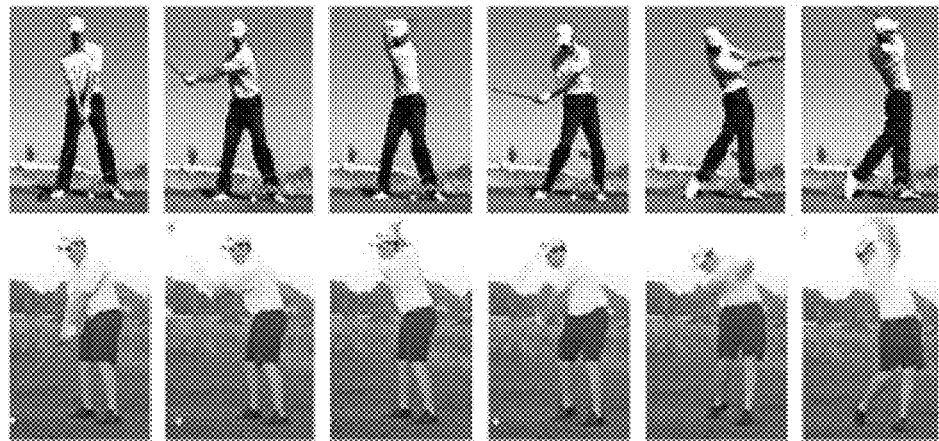
FIG. 16 shows examples of matching action sequences.
Figure 16:
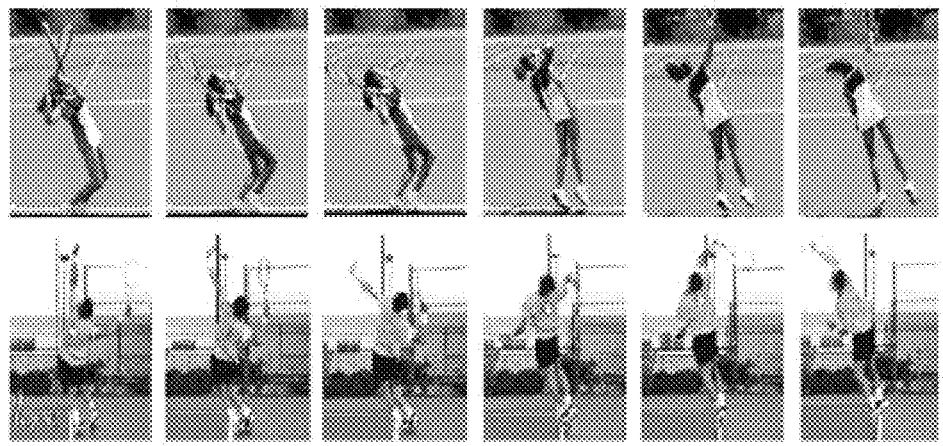
Figure 16:
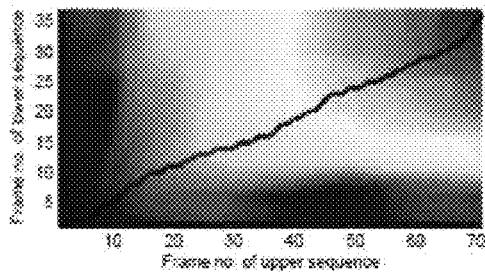
Figure 16:
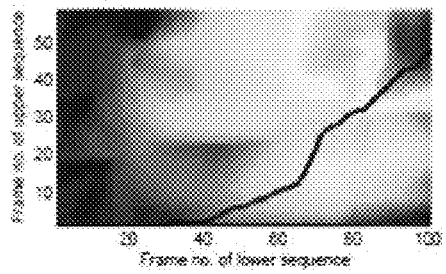

2. Tests on real data. We collected video data from Internet, consisting of 56 sequences of 8 classes of actions. FIG. 16 (a) shows an example of matching action sequences. The frame rates and viewpoints of two sequences are different, and two players perform golf-swing action at different speeds. The accumulated score matrix and back-tracked path in dynamic programming are shown in FIG. 7 (c). Another result on tennis-serve sequences is shown in FIGS. 16 (b) and (d). We built an action database DB by selecting one sequence for each action; the rest were used as test data, and were matched against all actions in the DB. An action was recognized as the one with highest matching score. The confusion matrix is shown in Table 2, which indicates an overall 95.83% classification accuracy for real data.

Table V shows a comparison of different methods as follows: [16] V. Parameswaran and R. Chellappa. View invariants for human action recognition. *Proc. IEEE CVPR*, 2, 2003. [32] D. Weinland, R. Ronfard, and E. Boyer. Free viewpoint action recognition using motion history volumes. *Computer Vision and Image Understanding*, 104(2-3):249-257, 2006. [28] T. Syeda-Mahmood, A. Vasilescu, S. Sethi, I. Center, and C. San Jose. Recognizing action events from multiple viewpoints. *Proc. IEEE Workshop on Detection and Recognition of Events in Video*, pages 64-72, 2001. [2] M. Ahmad and S. Lee. HMM-based Human Action Recognition Using Multiview Image Sequences. ICPR, pages 263-266, 2006. [22] C. Rao, A. Yilmaz, and M. Shah. View-Invariant Representation and Recognition of Actions. *International Journal of Computer Vision*, 50(2):203-226, 2002. [33] A. Yilmaz and M. Shah. Actions sketch: a novel action representation. *Proc. IEEE Computer Vision and Pattern Recognition*, 1, 2005. [26] Y. Sheikh and M. Shah. Exploring the Space of a Human Action. *Proc. IEEE International Conference on Computer Vision*, 1, 2005. [9] A. Gritai, Y. Sheikh, and M. Shah. On the use of anthropometry in the invariant analysis of human actions. *Proc. International Conference on Pattern Recognition*, 2, 2004.

TABLE V

COMPARISON OF DIFFERENT METHODS:

| Methods | # of views | Camera model | Input | Other assumptions |
|---|---|---|---|---|
| Ours | 1 | Persp. projective | Body points | |
| [16] | 1 | Persp. projective | Body points | five preselected coplanar points or limbs trace planar area |
| [32] | 5 | Persp. projective | Visual hulls | |
| [28] | 1 | Persp. projective | Feature points | |
| [2] | >1 | Persp. projective | Optical flow and silhouettes | |
| [22] | 1 | Affine | Body points | |
| [33] | 1 | Affine | Silhouettes | |
| [26] | 1 | Affine | Body points | Same start and end of sequences |
| [9] | 1 | Persp. projective | Body points | |

Table 6, below, shows a confusion matrix.

TABLE VI

Confusion matrix.

| Ground-true actions | Recognized as action | | | | | | | |
|---|---|---|---|---|---|---|---|---|
| | #1 | #2 | #3 | #4 | #5 | #6 | #7 | #8 |
| #1 | 3 | | | | | | | |
| #2 | 1 | 10 | | | | | | |
| #3 | | | 5 | | | | | |
| #4 | | | | 7 | | | | |
| #5 | | | | | 3 | | | |
| #6 | | | | | 1 | 6 | | |
| #7 | | | | | | | 3 | |
| #8 | | | | | | | | 9 |

The actions are denoted by numbers:
1 - ballet fouette,
2 - ballet spin,
3 - pushup,
4 - golf swing,
5 - one handed tennis backhand,
6 - two handed tennis backhand,
7 - tennis forehand,
8 - tennis serve.
The diagonal nature of the matrix indicates high accuracy.

An exemplary system for implementing the invention includes a computing device or a network of computing devices. In a basic configuration, computing device may include any type of stationary computing device or a mobile computing device. Computing device typically includes at least one processing unit and system memory. Depending on the exact configuration and type of computing device, system memory may be volatile (such as RAM), non-volatile (such as ROM, flash memory, and the like) or some combination of the two. System memory typically includes operating system, one or more applications, and may include program data. Computing device may also have additional features or functionality. For example, computing device may also include additional data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules or other data. System memory, removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by computing device. Any such computer storage media may be part of device. Computing device may also have input device(s) such as a camera, keyboard, mouse, pen, voice input device, touch input device, etc. Output device(s) such as a display, speakers, printer, etc. may also be included. Computing device also contains communication connection(s) that allow the device to communicate with other computing devices, such as over a network or a wireless network. By way of example, and not limitation, communication connection(s) may include wired media such as a wired network or direct-wired connection, and wireless media such as acoustic, RF, infrared and other wireless media.

Computer program code for carrying out operations of the invention described above may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller. A code in which a program of the present invention is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The present invention can be configured for use in a computer or an information processing apparatus which includes a memory, such as a central processing unit (CPU), a RAM and a ROM as well as a storage medium such as a hard disc.

The "step-by-step process" for performing the claimed functions herein is a specific algorithm and is shown in the text of the specification as prose and/or in the flow charts. The instructions of the software program create a special purpose machine for carrying out the particular algorithm. In any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While various embodiments of the present invention have been shown and described herein, it will be obvious that such embodiments are provided by way of example only. Numerous variations, changes and substitutions may be made without departing from the invention herein.

References cited and incorporated herein include: 1. J. Aggarwal and Q. Cai. Human motion analysis: A review. *Computer Vision and Image Understanding*, 73(3):428-440, 1999. 2. M. Ahmad and S. Lee. HMM-based Human Action Recognition Using Multiview Image Sequences. ICPR, pages 263-266, 2006. 3. M. Blank, L. Gorelick, E. Shechtman, M. Irani, and R. Basri. Actions as space-time shapes. In *Proc. ICCV*, volume 2, pages 1395-1402, 2005. 4. A. Bobick and J. Davis. The recognition of human movement using temporal templates. *IEEE Transactions on Pattern Analysis and Machine Intelligence*, 23(3):257-267, 2001. 5. F. Cuzzolin. Using Bilinear Models for View-invariant Action and Identity Recognition. *Proc. IEEE CVPR*, 2:1701-1708, 2006. 6. A. Efros, A. Berg, G. Mori, and J. Malik. Recognizing action at a distance. *Proc. IEEE International Conference on Computer Vision*, pages 726-733, 2003. 7. D. Gavrila. Visual analysis of human movement: A survey. *Computer Vision and Image Understanding*, 73(1):82-98, 1999. 8. L. V. Gool and A. Proesmans. Grouping and invariants using planar homologies. 9. A. Gritai, Y. Sheikh, and M. Shah. On the use of anthropometry in the invariant analysis of human actions. *Proc. International Conference on Pattern Recognition*, 2, 2004. 10. R. I. Hartley and A. Zisserman. *Multiple View Geometry in Computer Vision*. Cambridge University Press, ISBN: 0521540518, second edition, 2004. 11. G. Johansson. Visual perception of biological motion and a model for its analysis. Perception and Psychophysics, 14:201-211, 1973. 12. I. Laptev, S. Belongie, P. Perez, J. Wills, C. universitaire de Beaulieu, and U. San Diego. Periodic Motion Detection and Segmentation via Approximate Sequence Alignment. *Proc. IEEE International Conference on Computer Vision*, pages 816-823, 2005. 13. F. Lv and R. Nevatia. Single View Human Action Recognition using Key Pose Matching and Viterbi Path Searching. CVPR, pages 1-8, 2007. 14. T. Moeslund and E. Granum. A survey of computer vision-based human motion capture. *Computer Vision and Image Understanding*, 81(3):231-268, 2001. 15. T. Moeslund, A. Hilton, and V. Krüger. A survey of advances in vision-based human motion capture and analysis. *Computer Vision and Image Understanding*, 104(2-3):90-126, 2006. 16. V. Parameswaran and R. Chellappa. View invariants for human action recognition. *Proc. IEEE CVPR*, 2, 2003. 17. V. Parameswaran and R. Chellappa. View Invariance for Human Action Recognition. *IJCV*, 66(1):83-101, 2006. 18. V. Pavlovic, J. Rehg, T. Cham, and K. Murphy. A Dynamic Bayesian Network Approach to Figure Tracking using Learned Dynamic Models. *Proc. ICCV*, 1:94-101, 1999. 19. P. Pritchett and A. Zisserman. Matching and reconstruction from widely separated views. In *SMILE '98: Proceedings of the European Workshop on 3D Structure from Multiple Images of Large-Scale Environments*, pages 78-92. Springer-Verlag, 1998. 20. D. Ramanan, D. Forsyth, and A. Zisserman. Strike a pose: Tracking people by finding stylized poses. In *Proc. CVPR, Volume* 1, pages 271-278, 2005. 21. D. Ramanan, D. Forsyth, and A. Zisserman. Tracking people and recognizing their activities. In *Video Proceeedings of Computer Vision and Pattern Recognition (VPCVPR)*, page 1194, 2005. 22. C. Rao, A. Yilmaz, and M. Shah. View-Invariant Representation and Recognition of Actions. *International Journal of Computer Vision*, 50(2): 203-226, 2002. 23. J. Rehg and T. Kanade. Model-based tracking of self-occluding articulated objects. *Proc. Int. Conf Computer Vision*, pages 612-617, 1995. 24. Schuldt, I. Laptev, and B. Caputo. Recognizing human actions: a local SVM approach. *Proc. International Conference on Pattern Recognition*, 3, 2004. 25. J. G. Semple and G. Kneebone. *Algebraic Projective Geometry*. Oxford University Press, 1979. 26. Y. Sheikh and M. Shah. Exploring the Space of a Human Action. *Proc. IEEE International Conference on Computer Vision*, 1, 2005. 27. J. Sullivan and S. Carlsson. Recognizing and tracking human action. In *Proc. ECCV*, pages 629-644, 2002. 28. T. Syeda-Mahmood, A. Vasilescu, S. Sethi, I. Center, and C. San Jose. Recognizing action events from multiple viewpoints. *Proc. IEEE Workshop on Detection and Recognition of Events in Video*, pages 64-72, 2001. 29. T. Vi'eville and Q.-T. Luong. Motion of points and lines in the uncalibrated case. Technical report 2054, INRIA, 1993. 30. L. Wang. Abnormal Walking Gait Analysis Using Silhouette-Masked Flow Histograms. *Proc. International Conference on Pattern Recognition*, pages 473-476, 2006. 31. L. Wang, W. Hu, T. Tan, et al. Recent developments in human motion analysis. *Pattern Recognition*, 36(3):585-601, 2003. 32. D. Weinland, R. Ronfard, and E. Boyer. Free viewpoint action recognition using motion history volumes. *Computer Vision and Image Understanding*, 104(2-3):249-257, 2006. 33. A. Yilmaz and M. Shah. Actions sketch: a novel action representation. *Proc. IEEE Computer Vision and Pattern Recognition*, 1, 2005. 34. A. Yilmaz and M. Shah. Matching actions in presence of camera motion. *Computer Vision and Image Understanding*, 104(2-3):221-231, 2006. 35. V. Zatsiorsky. *Kinematics of Human Motion*. Human Kinetics, 2002. 36. L. Zelnik-Manor and M. Irani. Multiview constraints on homographies. *IEEE Trans. Pattern Anal. Mach. Intell.*, 24(2):214-223, 2002. 37. Z. Zhang and C. Loop. Estimating the fundamental matrix by transforming image points in projective space. *Computer Vision and Image Understanding*, 82(2):174-180, 2001. 38. G. Zhu, C. Xu, W. Gao, and Q. Huang. Action Recognition in Broadcast Tennis Video Using Optical Flow and Support Vector Machine. *Lecture Notes in Computer Science*, 3979:89, 2006. 39. X. Cao, J. Xiao, and H. Foroosh. Camera Motion Quantification and Alignment. Proc. ICPR, 13-16, 2006. 40. Richard I. Hartley, "In Defense of the Eight-Point Algorithm". *IEEE Transaction on Pattern Recognition and Machine Intelligence*, 19 (6): 580-593, 1997.

The invention claimed is:

1. A computer-implemented method for recognizing pose and action of articulated objects, comprising:
    (a) receiving by a computing device action sequence information as a set of points for each of a plurality of images obtained from a single camera view, wherein the set of points represents a pose P of an articulated object defined by M body points obtained by using an articulated object tracking technique;
    (b) processing the action sequence information by dividing the set of points into triplets of points, wherein each triplet of non-collinear points defines a plane in 3D space, and determining a pose transition from a rigid motion of the plane in 3D space;
    (c) finding one or more probable matches by comparing the pose transition of the action sequence information to a pose transition of a reference sequence; and
    (d) outputting at least one of the one or more probable matches;
    wherein invariants of the planes are found for the rigid motion of the planes across two frames; and
    wherein the invariants of the planes are found by one or both of a vector of fundamental ratios and an equality of eigenvalues of cross-homography, thereby providing a view-invariant recognition of actions.

2. The computer-implemented method of claim 1 wherein the action sequence information is received in real time or from previously recorded action sequence information.

3. The computer-implemented method of claim 1 wherein the reference sequence comprises a sequence of two-dimensional (2D) poses for each of a known action maintained in an action database of known actions.

4. The computer-implemented method of claim 1 wherein the pose P is represented by M body points such that P={$m_i$=1 ... M}.

5. The computer-implemented method of claim 1 further comprising calculating and outputting by the processing device confidence level information for the one or more probable matches.

6. The computer-implemented method of claim 1 wherein the vector of fundamental ratios defines three projective invariants for a configuration involving a moving plane as a moving triplet of points as observed in two frames by a stationary camera.

7. The computer-implemented method of claim 1 wherein the output of at least one of the one or more probable matches is utilized in one or more of a video surveillance system or a gesture-based computer interface.

8. A non-transitory computer readable medium containing program instructions for execution on a computing device, which when executed by the computing device, causes the computing device to:
    (a) receive action sequence information as a set of points for each of a plurality of images obtained from a single camera view, wherein the set of points represents a pose P of an articulated object defined by M body points obtained by using an articulated object tracking technique;
    (b) process the action sequence information by dividing the set of points into triplets of points, wherein each triplet of non-collinear points defines a plane in 3D space, and determining a pose transition from a rigid motion of the plane in 3D space;
    (c) finding one or more probable matches by comparing the pose transition of the action sequence information to a pose transition of a reference sequence; and
    (d) output at least one of the one or more probable matches;
    wherein invariants of the planes are found for the rigid motion of the planes across two frames; and
    wherein the invariants of the planes are found by one or both of a vector of fundamental ratios and an equality of eigenvalues of cross-homography, thereby providing a view-invariant recognition of actions.

9. The non-transitory computer readable medium of claim 8 further comprising calculating and outputting by the processing device confidence level information for the one or more probable matches.

10. The non-transitory computer readable medium of claim 8 wherein the vector of fundamental ratios defines three projective invariants for a configuration involving a moving plane as a moving triplet of points as observed in two frames by a stationary camera.

11. A system for recognizing pose and action of articulated objects, comprising:
   a computing device having at least one processing device, a memory coupled to the processing device, the computing device in communication with a data source comprising action sequence information of an articulated object and a database of known actions; wherein the processing device executes a program residing in the memory to:
   (a) receive the action sequence information from the data source as a set of points for each of a plurality of images obtained from a single camera view, wherein the set of points represents a pose P of an articulated object defined by M body points obtained by using an articulated object tracking technique;
   (b) process the action sequence information by dividing the set of points into triplets of points, wherein each triplet of non-collinear points defines a plane in 3D space, and determining a pose transition from a rigid motion of the plane in 3D space;
   (c) find one or more probable matches by comparing the pose transition of the action sequence information to a pose transition of a reference sequence; and
   (d) output at least one of the one or more probable matches;
   wherein invariants of the planes are found for the rigid motion of the planes across two frames; and
   wherein the invariants of the planes are found by one or both of a vector of fundamental ratios and an equality of eigenvalues of cross-homography, thereby providing a view-invariant recognition of actions.

12. The system of claim 11 further comprising calculating and outputting by the processing device confidence level information for the one or more probable matches.

13. The system of claim 11 wherein the vector of fundamental ratios defines three projective invariants for a configuration involving a moving plane as a moving triplet of points as observed in two frames by a stationary camera.

* * * * *